United States Patent
Jolly et al.

(10) Patent No.: US 8,435,002 B2
(45) Date of Patent: May 7, 2013

(54) HELICOPTER VIBRATION CONTROL SYSTEM AND ROTATING ASSEMBLY ROTARY FORCES GENERATORS FOR CANCELING VIBRATIONS

(75) Inventors: Mark R. Jolly, Raleigh, NC (US); Andrew D. Meyers, Apex, NC (US)

(73) Assignee: Lord Corporation, Cary, NC (US)

( * ) Notice: Subject to any disclaimer, the term of this patent is extended or adjusted under 35 U.S.C. 154(b) by 682 days.

(21) Appl. No.: 12/637,174

(22) Filed: Dec. 14, 2009

(65) Prior Publication Data
US 2010/0221110 A1    Sep. 2, 2010

Related U.S. Application Data

(63) Continuation-in-part of application No. 12/286,461, filed on Sep. 30, 2008, now Pat. No. 7,942,633, which
(Continued)

(51) Int. Cl.
*F01D 5/10*    (2006.01)

(52) U.S. Cl.
USPC ...... 416/1; 416/55; 416/60; 416/61; 416/500; 415/1; 415/10; 415/119

(58) Field of Classification Search ............... 415/1, 10, 415/119; 416/1, 55, 60, 61, 500
See application file for complete search history.

(56) References Cited

U.S. PATENT DOCUMENTS

| | | |
|---|---|---|
| 3,219,120 A | 11/1965 | Hooper |
| 3,509,971 A | 5/1970 | Gerstine et al. |

(Continued)

FOREIGN PATENT DOCUMENTS

| | | |
|---|---|---|
| EP | 00409462 A1 | 1/1991 |
| EP | 0601527 B1 | 4/1997 |

(Continued)

OTHER PUBLICATIONS

PCT International Search Report for PCT International Application No. PCT/US09/67842.
(Continued)

*Primary Examiner* — Igor Kershteyn
(74) *Attorney, Agent, or Firm* — Richard G. Miller

(57) ABSTRACT

A rotary blade rotating hub mounted rotating assembly vibration control system including a first imbalance mass concentration rotor, a second imbalance mass concentration rotor, a third imbalance mass concentration rotor, and a fourth imbalance mass concentration rotor. The first imbalance mass concentration rotor has a first imbalance mass concentration rotor center axis rotation centered on the rotating assembly center rotation axis. The second imbalance mass concentration rotor has a second imbalance mass concentration rotor center axis rotation centered on the rotating assembly center rotation axis. The third imbalance mass concentration rotor has a third imbalance mass concentration rotor center axis rotation centered on the rotating assembly center rotation axis. The fourth imbalance mass concentration rotor has a fourth imbalance mass concentration rotor center axis rotation centered on the rotating assembly center rotation axis. The first and second imbalance mass concentration rotors are driven at a first rotation speed greater than the rotating assembly operational rotation frequency while controlling the rotational position of the first imbalance mass concentration and the second imbalance mass concentration to produce a first rotating net force vector to inhibit a first vibration frequency. The third and fourth imbalance mass concentration rotors are driven at a second rotation speed greater than the rotating assembly operational rotation frequency while controlling the rotational position of the third imbalance mass concentration and the fourth imbalance mass concentration to produce a second rotating net force vector to inhibit a second vibration frequency.

17 Claims, 28 Drawing Sheets

Related U.S. Application Data is a continuation of application No. 11/215,388, filed on Aug. 30, 2005, now Pat. No. 7,448,854, application No. 12/637,174, which is a continuation-in-part of application No. 11/557,384, filed on Nov. 7, 2006, now Pat. No. 7,722,322, which is a continuation-in-part of application No. 11/215,388, filed on Aug. 30, 2005, now Pat. No. 7,448,854.

(60) Provisional application No. 60/605,470, filed on Aug. 30, 2004, provisional application No. 60/734,232, filed on Nov. 7, 2005, provisional application No. 61/122,160, filed on Dec. 12, 2008.

(56) References Cited

U.S. PATENT DOCUMENTS

| | | |
|---|---|---|
| 3,538,469 A | 11/1970 | Litte et al. |
| 3,540,809 A | 11/1970 | Paul et al. |
| 3,635,427 A | 1/1972 | Balke |
| 3,649,132 A | 3/1972 | Arcidiacono |
| 3,761,851 A | 9/1973 | Nelson |
| 3,770,997 A | 11/1973 | Presley |
| 3,783,746 A | 1/1974 | Jacobellis |
| 3,807,678 A | 4/1974 | Karnopp et al. |
| 3,839,945 A | 10/1974 | Jacobellis |
| 4,057,363 A | 11/1977 | Kenigsberg et al. |
| 4,083,654 A | 4/1978 | Kenigsberg et al. |
| 4,218,187 A | 8/1980 | Madden |
| 4,255,084 A | 3/1981 | Mouille et al. |
| 4,326,158 A | 4/1982 | Helgesen |
| 4,426,911 A | 1/1984 | Robinson et al. |
| 4,901,573 A | 2/1990 | Srinivasan et al. |
| 4,928,028 A | 5/1990 | Leibovich |
| 4,953,098 A | 8/1990 | Fischer, Jr. et al. |
| 5,219,143 A | 6/1993 | Staple et al. |
| 5,310,137 A | 5/1994 | Yoerkie, Jr. et al. |
| 5,369,348 A | 11/1994 | Gennesseaux |
| 5,497,861 A | 3/1996 | Brotz |
| 5,553,514 A | 9/1996 | Walkowc |
| 5,620,068 A | 4/1997 | Garnjost et al. |
| 5,647,726 A | 7/1997 | Sehgal et al. |
| 5,757,662 A | 5/1998 | Dyer et al. |
| 5,903,077 A | 5/1999 | Garnjost et al. |
| 6,105,685 A | 8/2000 | Bald |
| 6,212,445 B1 | 4/2001 | Barba et al. |
| 6,236,934 B1 | 5/2001 | Dyer et al. |
| 6,318,527 B1 | 11/2001 | Byrnes et al. |
| 6,354,536 B1 | 3/2002 | Torok et al. |
| 6,416,016 B1 | 7/2002 | Welsh |
| 6,476,534 B1 | 11/2002 | Vanderbeck et al. |
| 6,480,609 B1 | 11/2002 | Strehlow et al. |
| 6,618,646 B1 | 9/2003 | Dyer |
| 6,644,590 B2 | 11/2003 | Terpay et al. |
| 6,769,872 B2 | 8/2004 | Torok et al. |
| 6,813,973 B1 | 11/2004 | Perry |
| 7,047,109 B2 | 5/2006 | Ogura et al. |
| 7,448,854 B2 | 11/2008 | Jolly et al. |
| 7,471,057 B2 | 12/2008 | Clary |
| 7,554,237 B2 | 6/2009 | Clary |
| 2001/0035068 A1 | 11/2001 | Case et al. |
| 2002/0123403 A1 | 9/2002 | Welsh |
| 2003/0060903 A1 | 3/2003 | MacMartin et al. |
| 2003/0089193 A1 | 5/2003 | Altieri et al. |
| 2004/0036367 A1 | 2/2004 | Denton et al. |
| 2004/0050999 A1 | 3/2004 | Hill et al. |
| 2004/0098168 A1 | 5/2004 | Dyer |
| 2005/0079056 A1 | 4/2005 | Welsh |
| 2005/0114053 A1 | 5/2005 | Southward et al. |
| 2005/0201863 A1 | 9/2005 | Welsh |
| 2006/0083617 A1 | 4/2006 | Jolly et al. |
| 2009/0035137 A1 | 2/2009 | Jolly et al. |
| 2009/0116963 A1 | 5/2009 | Welsh |
| 2009/0236468 A1* | 9/2009 | Welsh ............................. 416/1 |
| 2010/0012768 A1* | 1/2010 | Jolly ......................... 244/17.13 |
| 2010/0209242 A1* | 8/2010 | Popelka et al. ................... 416/1 |

FOREIGN PATENT DOCUMENTS

| | | |
|---|---|---|
| GB | 1120193 A | 7/1968 |
| JP | 61164109 | 7/1986 |
| JP | 61164109 A | 7/1986 |
| JP | 2001233296 | 8/2001 |
| WO | 2008133614 A1 | 11/2008 |

OTHER PUBLICATIONS

PCT International Search Report for PCT International Application No. PCT/US2005/030909.

MOOG Inc., General Characteristics—High Frequency Rotor/Stator Units, East Aurora, NY, pp. 1-6.

Kollmorgen, BM(S) Series Motors, Radford, VA, pp. 1-17.

Advanced Motion Controls, B30A40 Series Brushless Servo Amplifiers, Camarillo, CA, pp. C-59-C-66.

Wilson, et al., "Ground Test of a Hub Mounted Active Vibration Suppressor," American Helicopter Society 63rd Annual Forum, Virginia Beach, VA, May 1-3, 2007.

Peterson et al., "Dynamic Response of NASA Rotor Test Apparatus and Sikorsky S-76 Hub Mounted in the 80- by 120-Foot Wind Tunnel," NASA, Sep. 1994, pp. 1-36.

Bauchau et al., "Modeling the Bi¯lar Pendulum Using Nonlinear, Flexible Multibody Dynamics," Journal of the American Helicopter Society, vol. 47, No. 1, pp. 53-62, 2003.

PCT International Search Report for PCT International Application No. PCT/US09/67842, May 6, 2010.

PCT International Search Report for PCT International Application No. PCT/US2005/030909, Dec. 1, 2006.

MOOG Inc., General Characteristics—High Frequency Rotor/Stator Units, East Aurora, NY, pp. 1-6, Feb. 2001.

Kollmorgen, BM(S) Series Motors, Radford, VA, pp. 1-17, Mar. 2001.

Advanced Motion Controls, B30A40 Series Brushless Servo Amplifiers, Camarillo, CA, pp. C-59-C-66, Oct. 2002.

USPTO Office Action dated Oct. 16, 2007 for U.S. Appl. No. 11/215,388, now U.S. Patent No. 7,448,854 issued Nov. 11, 2008.

USPTO Office Action dated Jun. 15, 2010 for U.S. Appl. No. 12/286,461.

* cited by examiner

DUAL FREQUENCY HMVS

3P HMVS

HELICOPTER VIBRATION CONTROL SYSTEM AND ROTATING ASSEMBLY ROTARY FORCES GENERATORS FOR CANCELING VIBRATIONS

CROSS-REFERENCE

This application is a Continuation-In-Part (CIP) of U.S. patent application Ser. No. 12/286,461 filed on Sep. 30, 2008, now U.S. Pat. No. 7,942,633 which is a Continuation of U.S. patent application Ser. No. 11/215,388 filed on Aug. 30, 2005 and now U.S. Pat. No. 7,448,854 issued on Nov. 11, 2008, which claims benefit to U.S. Provisional Application 60/605,470 filed on Aug. 30, 2004, all of which the benefit is hereby claimed and are incorporated herein by reference. This application is a Continuation-In-Part (CIP) of U.S. patent application Ser. No. 11/557,384 filed on Nov. 7, 2006, now U.S. Pat. No. 7,722,322 which claims the benefit of U.S. Provisional Application 60/734,232 filed on Nov. 7, 2005 and is also a Continuation of U.S. patent application Ser. No. 11/215,388 filed on Aug. 30, 2005 and now U.S. Pat. No. 7,448,854 issued on Nov. 11, 2008, which claims benefit to U.S. Provisional Application 60/605,470 filed on Aug. 30, 2004, all of which the benefit is hereby claimed and are incorporated herein by reference. This application hereby claims the benefit to and incorporates by reference U.S. Provisional Application 61/122,160 filed on Dec. 12, 2008.

FIELD OF THE INVENTION

The invention relates to a method/system for controlling problematic rotary wing vibrations. More particularly the invention relates to a method and system for controlling helicopter vehicle vibrations, particularly a method and system for canceling problematic rotating helicopter vibrations.

BACKGROUND OF THE INVENTION

Helicopter vibrations are particularly troublesome in that they can cause fatigue and wear on the equipment and occupants in the aircraft. In rotating assembly aircraft vehicles such as helicopters, vibrations are particularly problematic in that they can damage the actual structure and components that make up the vehicle in addition to the contents of the vehicle.

There is a need for a system and method of accurately and economically canceling rotating vehicle vibrations. There is a need for a method of controlling vibrations in a helicopter hub so that the vibrations are efficiently minimized. There is a need for a robust system of controlling vibrations in a helicopter so that the vibrations are efficiently minimized. There is a need for a method/system for controlling problematic helicopter vibrations.

SUMMARY OF THE INVENTION

In an embodiment the invention includes a rotary blade rotating hub mounted rotating assembly vibration control system for a rotary blade rotating hub assembly experiencing a vibration of a plurality of vibration frequencies while rotating at an operational rotation frequency about a rotating assembly center axis of rotation. The rotating assembly vibration control system including a first imbalance mass concentration rotor, a second imbalance mass concentration rotor, a third imbalance mass concentration rotor, and a fourth imbalance mass concentration rotor. The first imbalance mass concentration rotor has a first imbalance mass concentration rotor center axis rotation centered on the rotating assembly center axis of rotation, the second imbalance mass concentration rotor has a second imbalance mass concentration rotor center axis rotation centered on the rotating assembly center axis of rotation, the third imbalance mass concentration rotor has a third imbalance mass concentration rotor center axis rotation centered on the rotating assembly center axis of rotation, and the fourth imbalance mass concentration rotor has a fourth imbalance mass concentration rotor center axis rotation centered on the rotating assembly center axis of rotation. The first imbalance mass concentration rotor and the second imbalance mass concentration rotor are driven at a first rotation speed greater than the rotating assembly operational rotation frequency while controlling the rotational position of the first imbalance mass concentration and the second imbalance mass concentration to produce a first rotating net force vector to inhibit a first vibration frequency. The third imbalance mass concentration rotor and the fourth imbalance mass concentration rotor driven at a second rotation speed greater than the rotating assembly operational rotation frequency while controlling the rotational position of the third imbalance mass concentration and the fourth imbalance mass concentration to produce a second rotating net force vector to inhibit a second vibration frequency.

In an embodiment the invention includes a computer program product for controlling a rotating vibration control system with a first imbalance mass concentration rotor, a second imbalance mass concentration rotor, a third imbalance mass concentration rotor, and a fourth imbalance mass concentration rotor. The computer program product includes a computer medium, first program instructions for driving the first imbalance mass concentration rotor and the second imbalance mass concentration rotor at a first rotation speed vibration canceling rotation frequency while controlling the rotational position of the first imbalance mass concentration and the second imbalance mass concentration to inhibit a first vibration frequency, and second program instructions for driving the third imbalance mass concentration rotor and the fourth imbalance mass concentration rotor at a second rotation speed vibration canceling rotation frequency while controlling the rotational position of the first imbalance mass concentration and the second imbalance mass concentration separate from the controlling of the first imbalance mass concentration and the second imbalance mass concentration to inhibit a second vibration.

In an embodiment the invention includes a computer program product for controlling a rotating assembly vibration control system. The computer program product includes a computer readable medium, first program instructions to control a rotation of a first rotor and a rotation of a second rotor, second program instructions to monitor a plurality of sensor signals, third program instructions to control the rotation speed, rotation direction and phase of the first rotor and the rotation speed, rotation direction and phase of the second rotor to minimize a first monitored vibration frequency sensor signal, fourth program instructions to control a rotation of a third rotor and a rotation of a fourth rotor, fifth program instructions to monitor a plurality of sensor signals, sixth program instructions to control the rotation speed, rotation direction and phase of the third rotor and the rotation speed, rotation direction and phase of the fourth rotor to minimize a second monitored vibration frequency sensor signal.

In an embodiment the invention includes a rotating vibration control system for a rotating assembly having at least a first vibration frequency operational vibration and at least a second vibration frequency operational vibration. The rotating vibration control system includes a first rotor with a first imbalance mass concentration, the first rotor driven to rotate at a first rotation speed greater than an operational rotation frequency of the rotating assembly, and a second rotor with a second imbalance mass concentration, the second rotor driven to rotate at the first rotation speed greater than an operational rotation frequency of the rotating assembly. The rotating vibration control system includes a third rotor with a third imbalance mass concentration, the third rotor driven to rotate at a second rotation speed greater than an operational rotation frequency of the rotating assembly, and a fourth rotor with a fourth imbalance mass concentration, the fourth rotor driven to rotate at the second rotation speed greater than an operational rotation frequency of the rotating assembly. The rotating vibration control system includes at least a first vibration sensor for producing a plurality of first vibration sensor signals. The rotating vibration control system includes at least a second vibration sensor for producing a plurality of second vibration sensor signals. The rotating vibration control system includes a first rotor rotational position sensor, a second rotor rotational position sensor, a third rotor rotational position sensor, and a fourth rotor rotational position sensor. The rotating vibration control system includes a first motor control for controlling the rotation of the first rotor and the rotation of the second rotor. The rotating vibration control system includes a first vibration control for providing commands to the first motor control to minimize the first vibration sensor signals and the second vibration sensor signals. The rotating vibration control system includes a second motor control for controlling the rotation of the third rotor and the rotation of the fourth rotor. The rotating vibration control system includes a second vibration control for providing commands to the second motor control to minimize the first vibration sensor signals and the second vibration sensor signals.

In an embodiment the invention includes a rotary wing rotating hub mounted vibration control system for a rotary wing hub having at least a first and a second vibration frequency while rotating at a rotary wing operational rotation frequency. The rotating hub mounted vibration control system includes a system housing, the system housing attached to the rotary wing hub and rotating with the rotary wing hub at the operational rotation frequency, the housing housing a first coaxial ring motor having a first rotor with a first imbalance mass concentration, a second coaxial ring motor having a second rotor with a second imbalance mass concentration, a third coaxial ring motor having a third rotor with a third imbalance mass concentration, and a fourth coaxial ring motor having a fourth rotor with a fourth imbalance mass concentration. The housing housing an electronics control system for controlling the vibration control system, the electronics control system including a first rotation speed rotor stage controller electronics control subsystem for controlling a rotational position of the first imbalance mass concentration rotor and a rotational position of the second imbalance mass concentration rotor, the first rotation speed rotor stage controller electronics control subsystem controlling a speed and a phase of the first coaxial ring motor and the second coaxial ring motor such that the first imbalance mass concentration and the second imbalance mass concentration are driven at a whole number multiple vibration canceling rotation frequency greater than the operational rotation frequency wherein the first rotary wing hub vibration frequency is reduced. The electronics control system including a second rotation speed rotor stage controller electronics control subsystem for controlling a rotational position of the third imbalance mass concentration rotor and a rotational position of the fourth imbalance mass concentration rotor, the second rotation speed rotor stage controller electronics control subsystem controlling a speed and a phase of the third coaxial ring motor and the fourth coaxial ring motor such that the third imbalance mass concentration and the fourth imbalance mass concentration are driven at a whole number multiple vibration canceling rotation frequency greater than the operational rotation frequency wherein the second helicopter rotary wing hub vibration frequency is reduced. Preferably the housed electronics control system including at least a first vibration sensor, preferably an accelerometer, for sensing the vibration frequencies.

In an embodiment the invention includes a method of controlling a plurality of vibration frequencies of an aircraft with a rotary hub which rotates at an operational rotation frequency. The method includes providing an annular ring housing containing a first coaxial ring motor having a first rotor with a first imbalance mass concentration, a second coaxial ring motor having a second rotor with a second imbalance mass concentration, a third coaxial ring motor having a third rotor with a third imbalance mass concentration, a fourth coaxial ring motor having a fourth rotor with a fourth imbalance mass concentration, and an electronics control system for controlling the vibration control system, the electronics control system including a first rotation speed rotor stage controller electronics control subsystem for controlling a rotational position of the first imbalance mass concentration rotor and a rotational position of the second imbalance mass concentration rotor, the electronics control system including a second rotation speed rotor stage controller electronics control subsystem for controlling a rotational position of the third imbalance mass concentration rotor and a rotational position of the fourth imbalance mass concentration rotor. The method includes securing the annular ring housing to the rotary hub with the annular ring housing rotating at the operational rotation frequency with the rotary hub, driving the first rotor and the second rotor at a first whole number multiple vibration canceling rotation frequency greater than the operational rotation frequency while controlling the rotational position of the first imbalance mass concentration and the second imbalance mass concentration in order to inhibit a first vibration frequency, and driving the third rotor and the fourth rotor at a second whole number multiple vibration canceling rotation frequency greater than the operational rotation frequency while controlling the rotational position of the third imbalance mass concentration and the fourth imbalance mass concentration in order to inhibit a second vibration frequency.

In an embodiment the invention includes a electronic computer system for controlling a rotating vibration control system with a first imbalance mass concentration rotor, a second imbalance mass concentration rotor, a third imbalance mass concentration rotor, and a fourth imbalance mass concentration rotor. The system driving the first imbalance mass concentration rotor and the second imbalance mass concentration rotor at a first rotation speed vibration canceling rotation frequency while controlling the rotational position of the first imbalance mass concentration and the second imbalance mass concentration to inhibit a first vibration frequency. The system driving the third imbalance mass concentration rotor and the fourth imbalance mass concentration rotor at a second rotation speed vibration canceling rotation frequency while controlling the rotational position of the third imbalance mass concentration and the fourth imbalance mass concentration separate from the controlling of the first imbalance mass concentration and the second imbalance mass concentration to inhibit a second vibration frequency.

In an embodiment the invention includes an electronic vibration control system, the system controlling a rotation of a first rotor and a rotation of a second rotor. The system monitors a plurality of sensor signals. The system controls the rotation speed, rotation direction and phase of the first rotor and the rotation speed, rotation direction and phase of the second rotor to minimize a first monitored vibration frequency sensor signal. The system controls a rotation of a third rotor and a rotation of a fourth rotor, with the system controlling the rotation speed, rotation direction and phase of the third rotor and the rotation speed, rotation direction and phase of the fourth rotor to minimize a second monitored vibration frequency sensor signal.

It is to be understood that both the foregoing general description and the following detailed description are exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principals and operation of the invention.

DETAILED DESCRIPTION OF THE PREFERRED EMBODIMENTS

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

Reference will now be made in detail to the present preferred embodiments of the invention, examples of which are illustrated in the accompanying drawings.

Figure 1B:
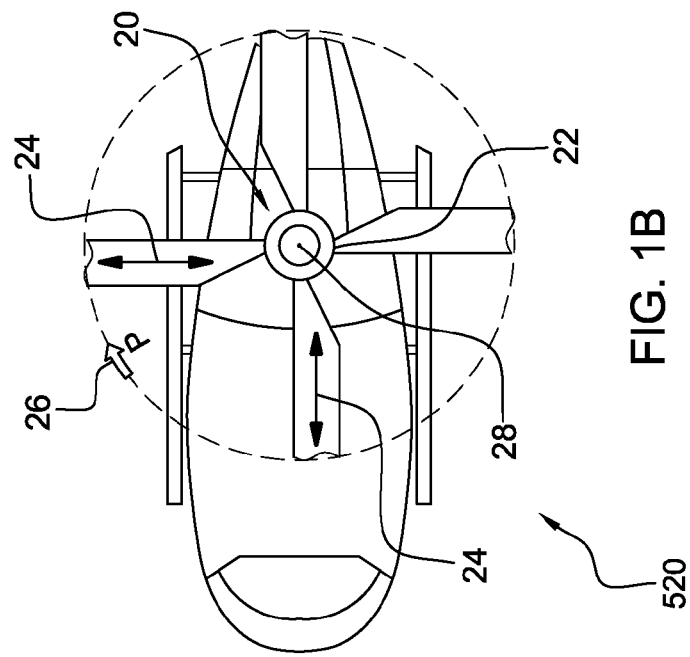
FIG. 1A-B illustrate methods/systems for controlling helicopter vibrations.
Figure 1A:
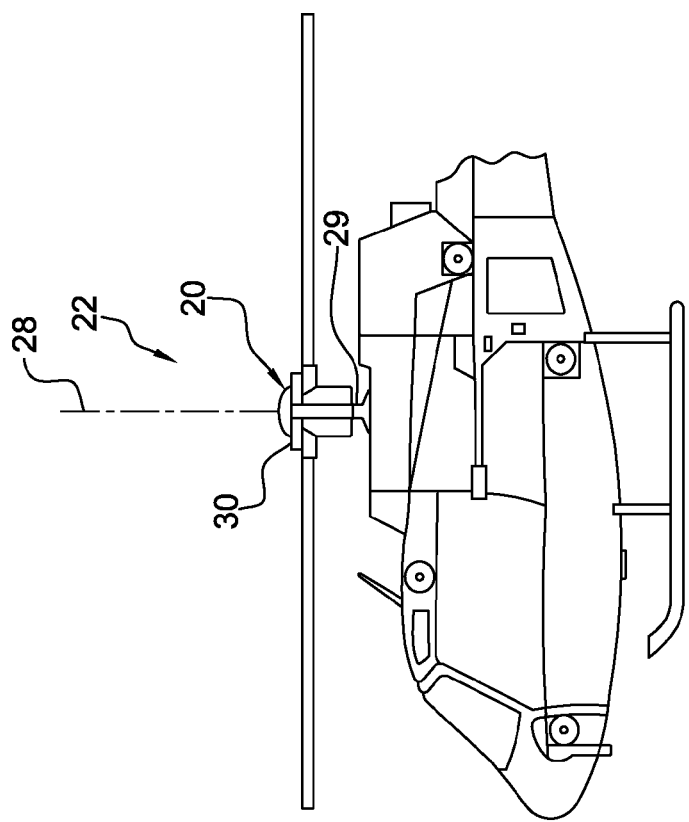

In an embodiment the invention includes a rotary blade rotary wing aircraft rotating hub mounted rotating assembly vibration control system for a rotary blade rotary wing aircraft rotating hub assembly experiencing a vibration of a plurality of vibration frequencies while rotating at an operational rotation frequency about a rotating assembly center axis of rotation. FIG. 1A-B illustrate a rotary blade rotary wing aircraft rotating hub mounted rotating assembly vibration control system 20 for a rotary blade rotary wing aircraft rotating hub assembly 22 experiencing a vibration 24 of a plurality of vibration frequencies while rotating at an operational rotation frequency 26 (1P) about a rotating assembly center axis of rotation 28. (As illustrated and labeled the rotating hub assembly is rotating at 1P in a clockwise direction relative to non-rotating aircraft body/ground references).

Figure 2A:
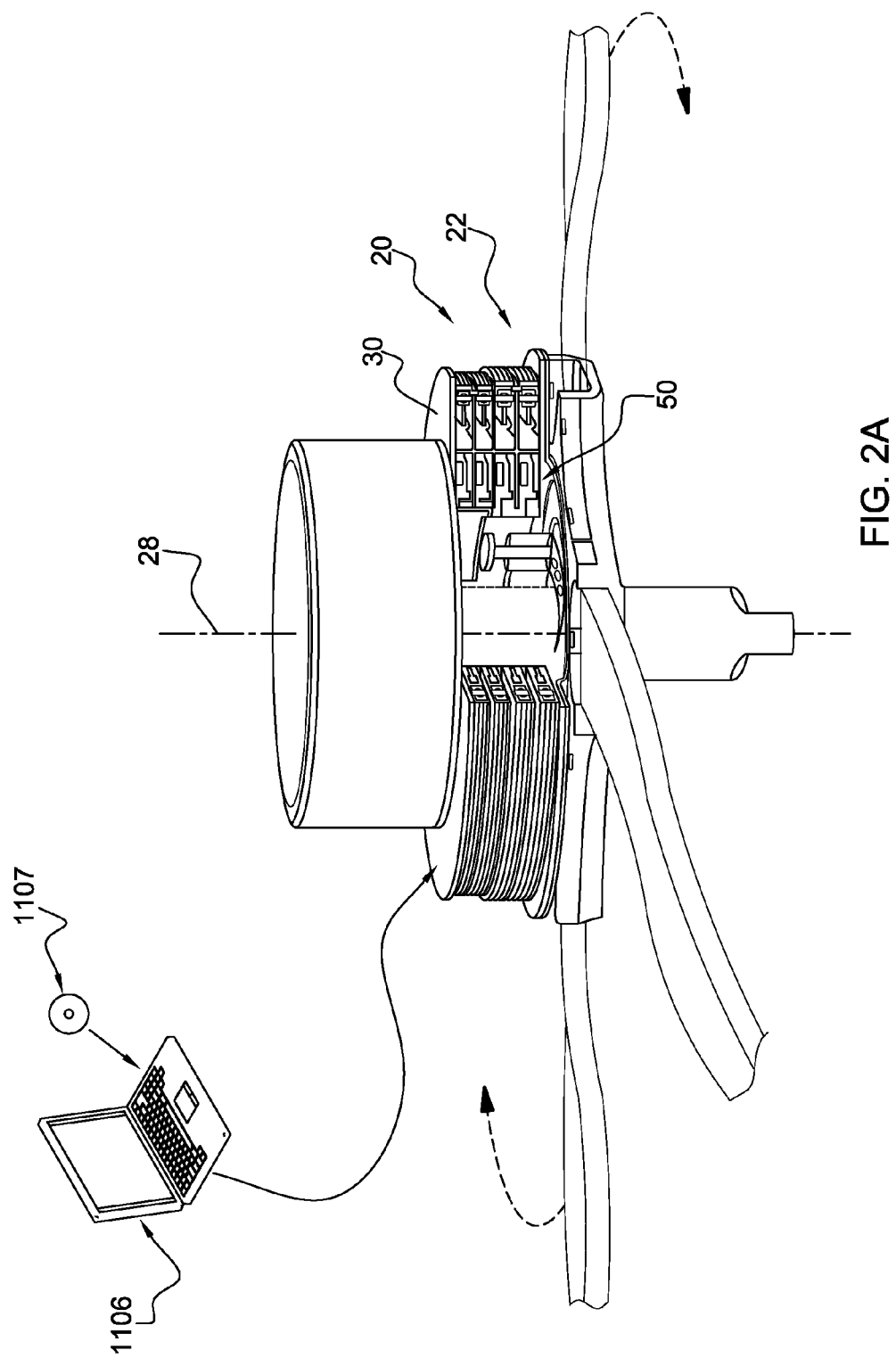
FIG. 2A-C illustrate a helicopter rotating hub mounted vibration control systems.
Figure 2B:
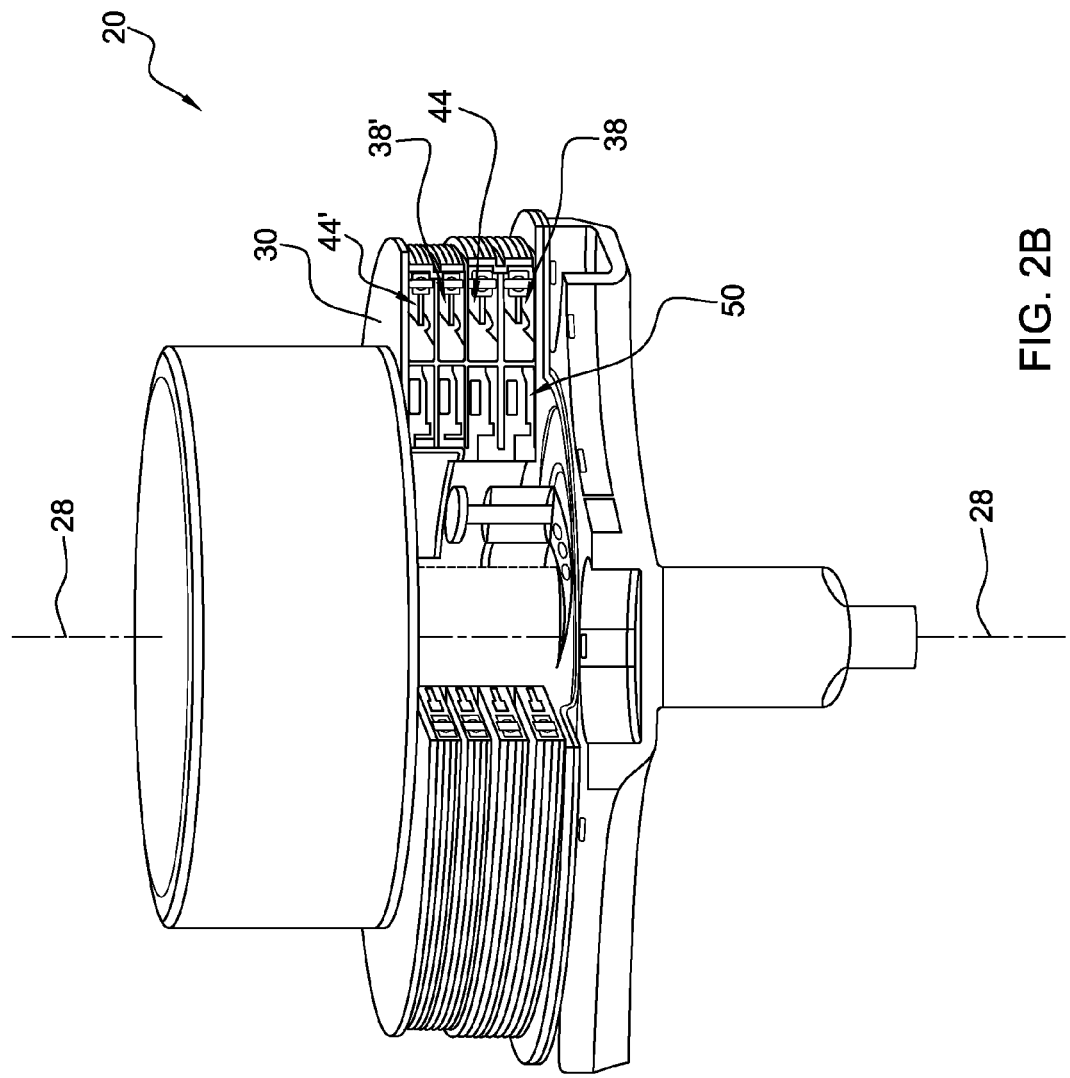
Figure 2C:
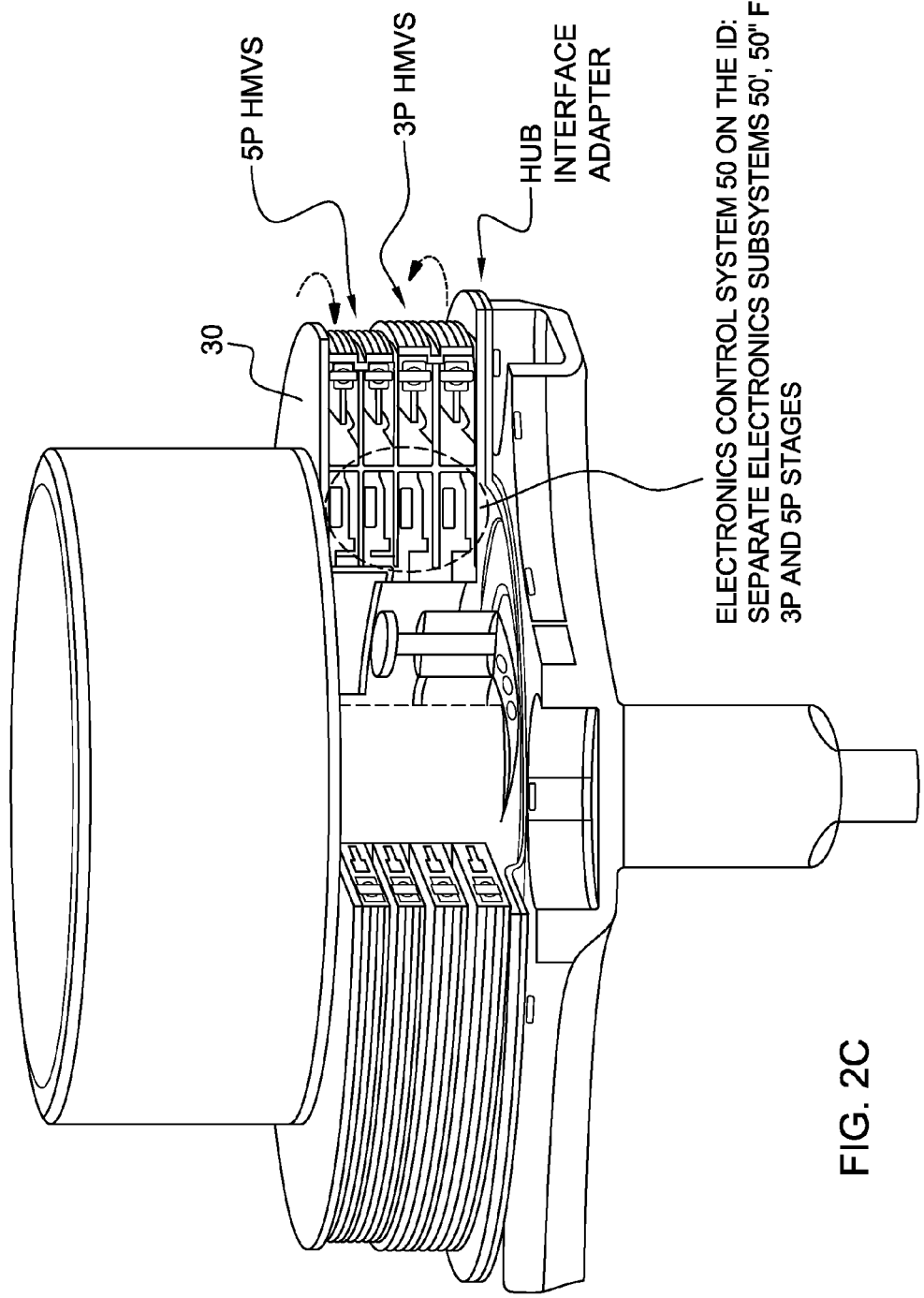
Figure 3:
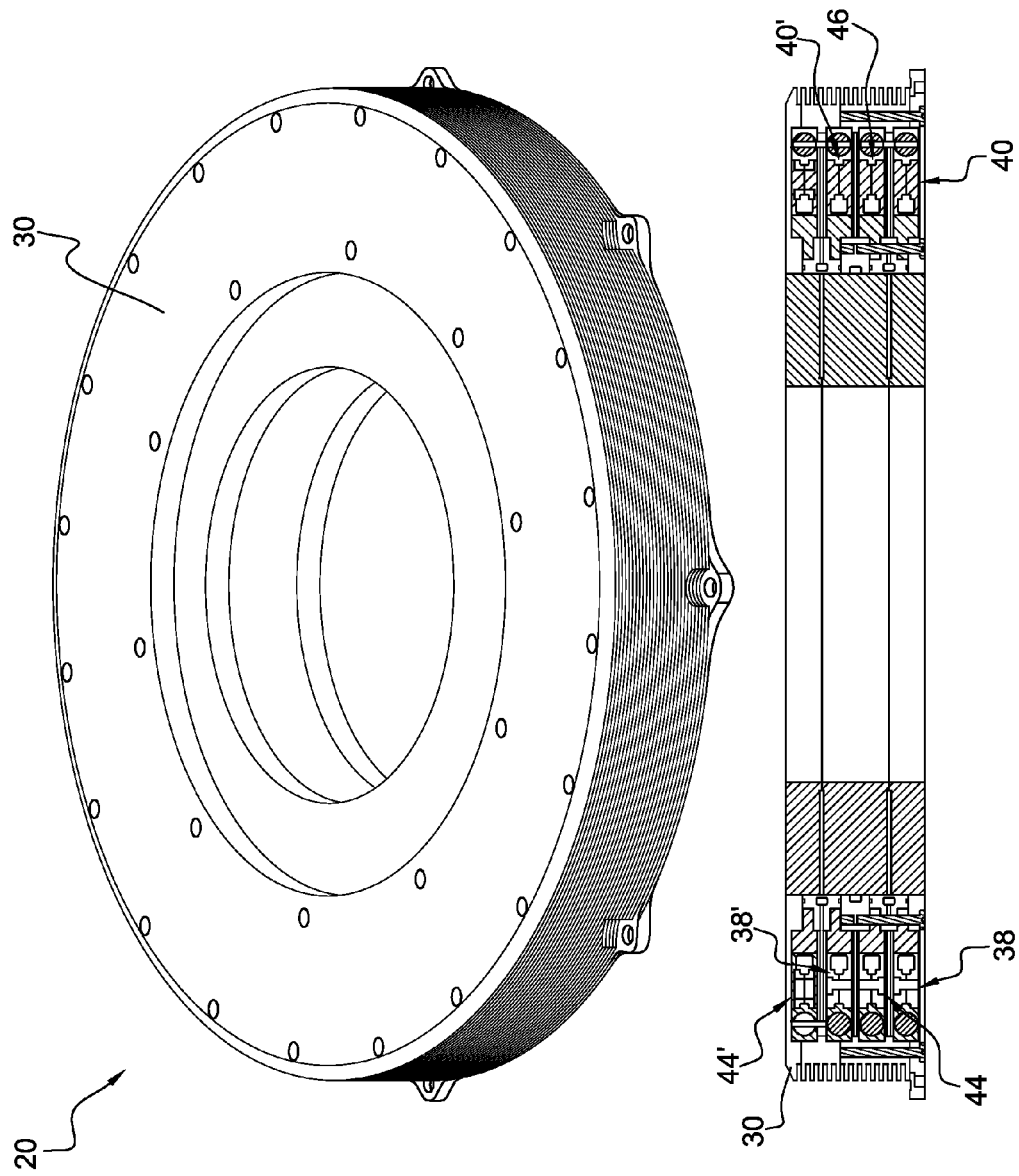
FIG. 3 illustrate a helicopter rotating hub mounted vibration control systems.
Figure 4A:
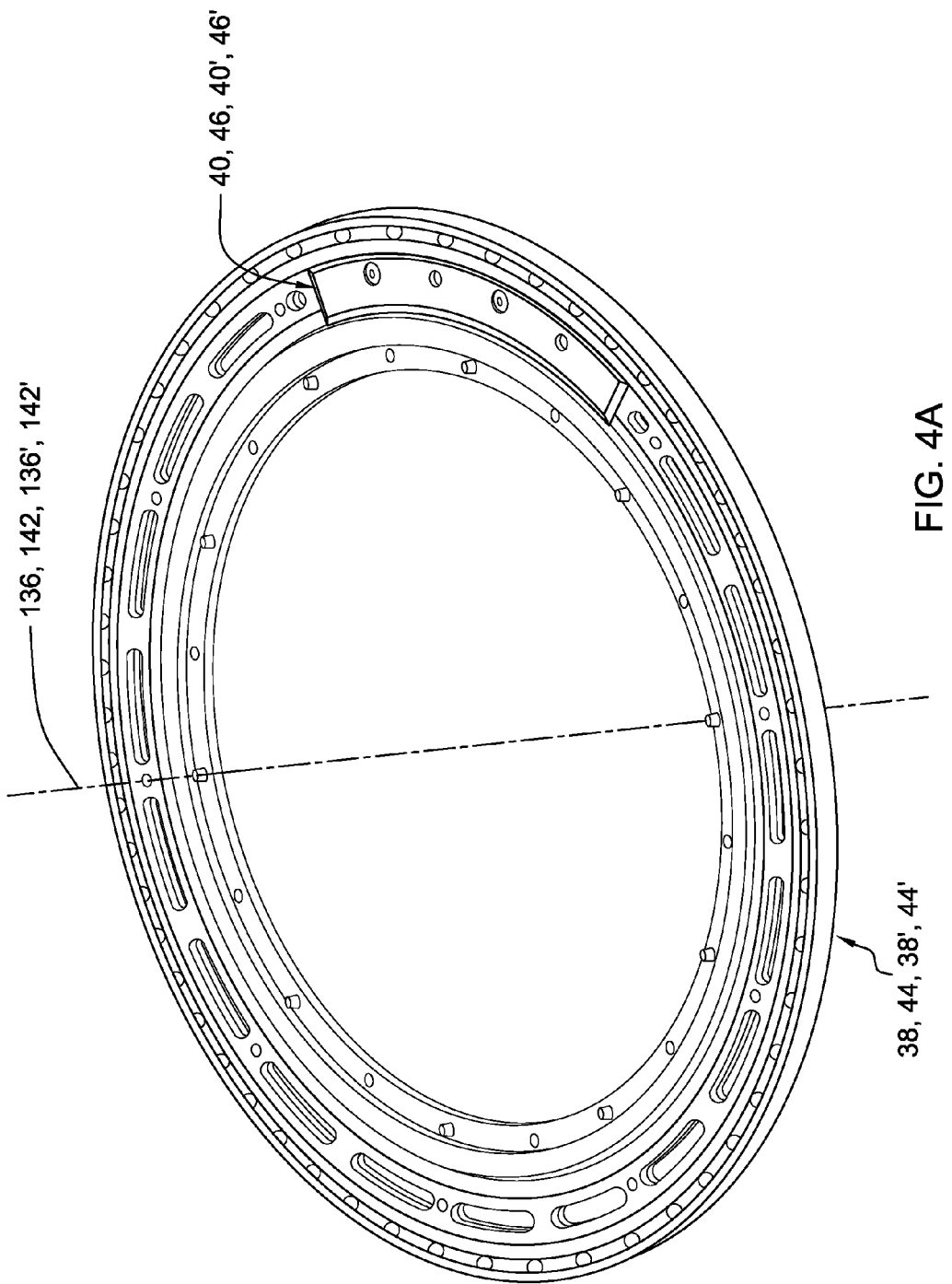
FIG. 4A-B illustrate helicopter rotating hub mounted vibration control system imbalance mass concentration rotors for controlling helicopter vibrations.
Figure 4B:
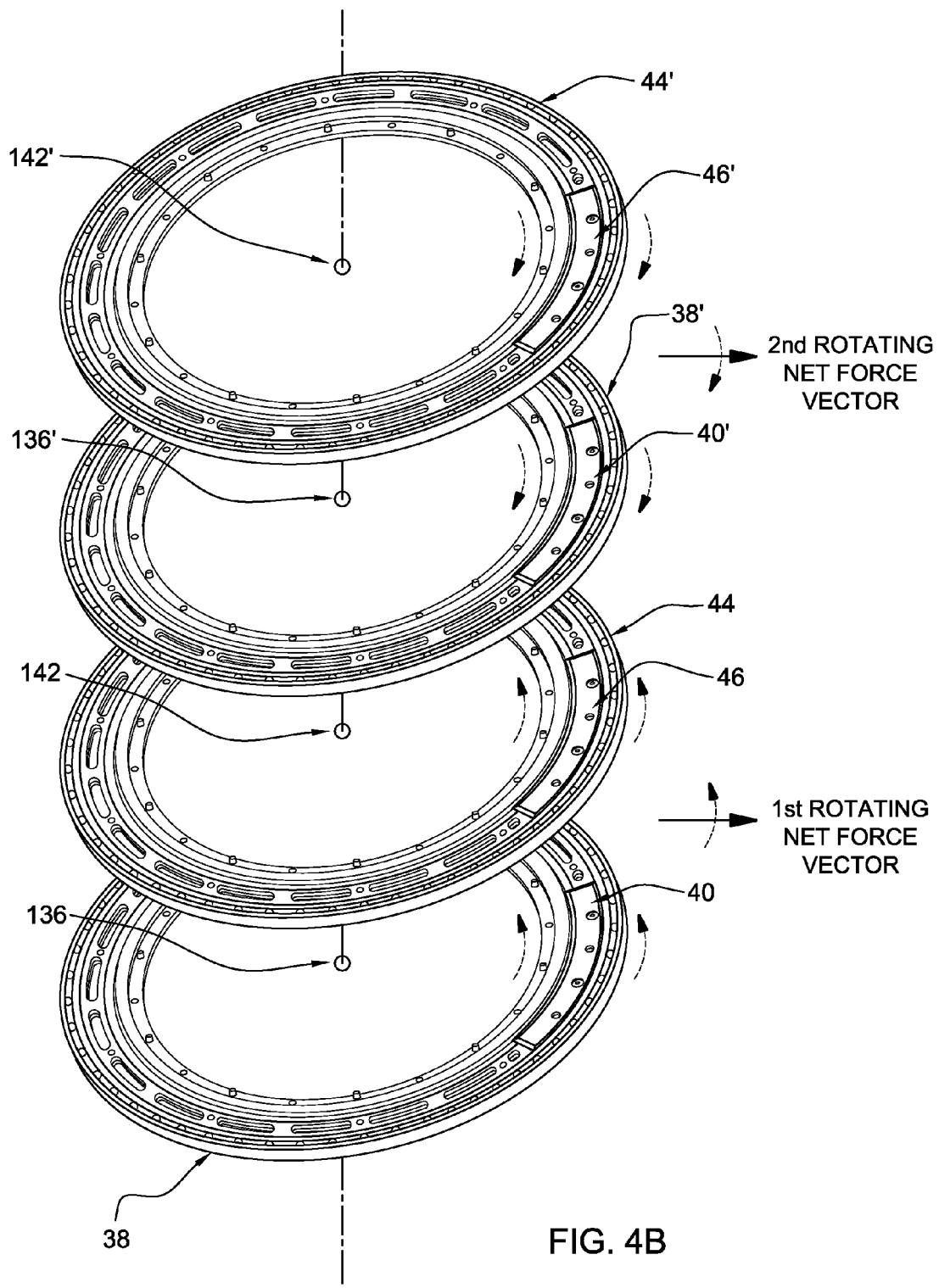

FIG. 2A-C illustrates a hub mounted rotating assembly vibration control system 20 with about a quarter section cut away to reveal the internals housed inside the annular ring housing 30. The helicopter rotating hub mounted vibration control system preferably includes an annular ring housing 30 attachable to the helicopter rotary wing hub and rotating with the helicopter rotary wing hub at the helicopter operational rotation frequency. The helicopter rotating hub mounted vibration control system housing 30 including a first imbalance mass concentration rotor 38, a second imbalance mass concentration rotor 44, a third imbalance mass concentration rotor 38', and a fourth imbalance mass concentration rotor 44'. FIG. 3 illustrates a further rotating assembly vibration control system 20, with a cross section showing the four rotors housed in the housing 30. FIG. 4A-B illustrate the imbalance mass concentration rotors with their mass concentrations 40, 46, 40', 46'. Preferably the first imbalance mass concentration rotor 38 has a first imbalance mass concentration rotor center axis of rotation 136 centered on the rotating assembly center axis of rotation 28, the second imbalance mass concentration rotor 44 having a second imbalance mass concentration rotor center axis of rotation 142 centered on the rotating assembly center axis of rotation 28, the third imbalance mass concentration rotor 38' having a third imbalance mass concentration rotor center axis of rotation 136' centered on the rotating assembly center axis of rotation 28, and the fourth imbalance mass concentration rotor 44' having a fourth imbalance mass concentration rotor center axis of rotation 142' centered on the rotating assembly center axis of rotation 28. The first imbalance mass concentration rotor 38 and the second imbalance mass concentration rotor 44 are driven at a first rotation speed greater than the rotating assembly operational rotation frequency 26 (1P) while controlling the rotational position of the first imbalance mass concentration 40 and the second imbalance mass concentration 46 to produce a first rotating net force vector to inhibit a first vibration frequency. In preferred embodiments as illustrated in FIG. 1-4, the first imbalance mass concentration rotor 38 and the second imbalance mass concentration rotor 44 are driven at a four multiple vibration canceling rotation frequency (4P) counter rotating direction (rotation opposing rotation of the rotating hub assembly) (counter clockwise if hub is rotating clockwise as illustrated). The first and second rotor imbalance mass concentrations 40, 46 are driven at 4P opposing the direction of the rotating hub rotation while controlling the rotational position of the first imbalance mass concentration 40 and the second imbalance mass concentration 46 to produce a first rotating net force vector. The third imbalance mass concentration rotor 38' and the fourth imbalance mass concentration rotor 44' are driven at a second rotation speed greater than the rotating assembly operational rotation frequency 26 (P) while controlling the rotational position of the third imbalance mass concentration 40' and the fourth imbalance mass concentration 46' to produce a second rotating net force vector. The first and second rotating force vectors are controlled to inhibit vibration frequency (4P). In a preferred embodiment as illustrated in FIG. 1-4, the third imbalance mass concentration rotor 38' and the fourth imbalance mass concentration rotor 44' are driven at a four multiple vibration canceling rotation frequency (4P) co-rotating direction rotating with the rotation of the rotating hub assembly (4P rotating in same direction as rotating hub, clockwise if hub is rotating clockwise as illustrated) while controlling the rotational position of the third imbalance mass concentration and the fourth imbalance mass concentration to produce a second rotating net force vector to inhibit a second vibration frequency (5P) with respect to the 1P rotating frame. With the rotor hub rotating at P, and having N blades, preferably the first and second imbalance mass concentrations are rotated at a whole number multiple of P, most preferably NP in the direction opposing the rotor hub rotation, and preferably the third and fourth imbalance mass concentrations are rotated at a whole number multiple of P, most preferably NP in the same direction as the rotor hub rotation. Preferably the first imbalance mass concentration is opposingly oriented relative to the second imbalance mass concentration during a starting stopping rotation speed less than the first rotation speed. Preferably the third imbalance mass concentration is opposingly oriented relative to the fourth imbalance mass concentration during a starting stopping rotation speed less than the second rotation speed.

Figure 5A:
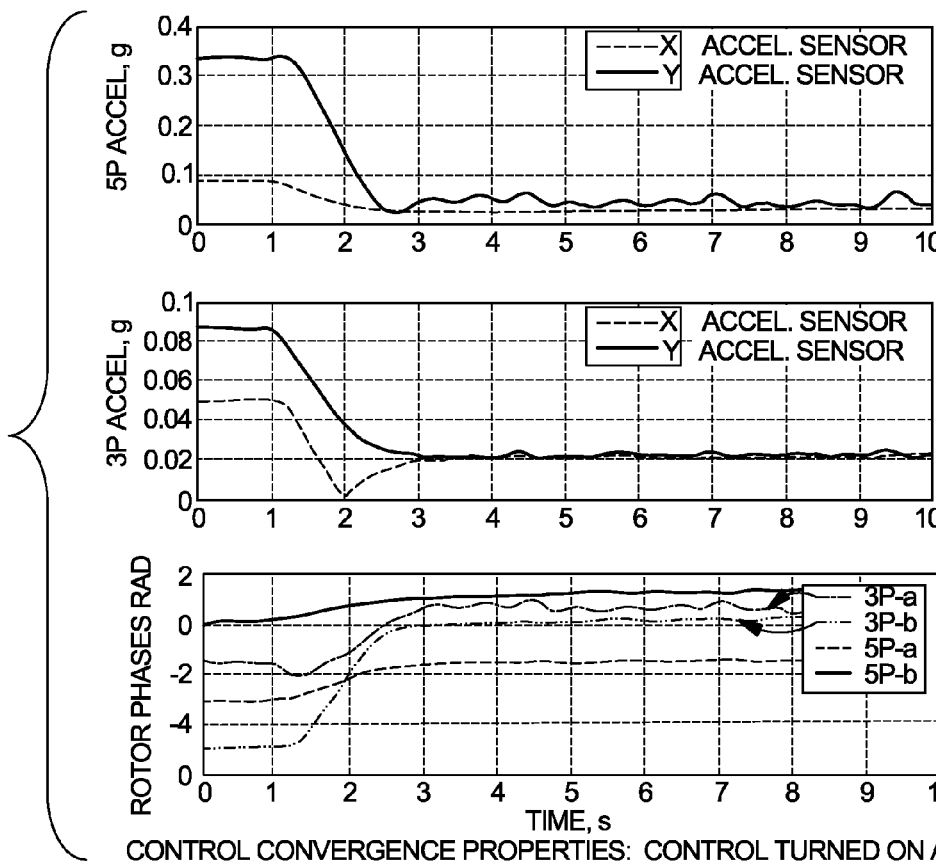
FIG. 5A-C illustrate simulated test data showing vibration control of a system inhibiting two distinct frequencies with the test simulated using a stationary helicopter body and rotor hub with vibrations inputted into the rotor hub using controlled linear actuator disturbance force generators to simulate the in-flight helicopter rotating hub vibrations.
Figure 5B:
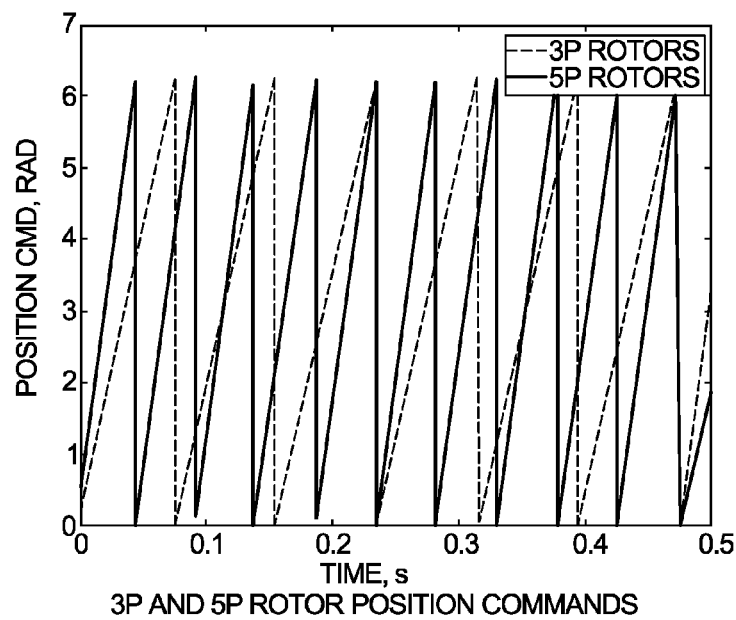
Figure 5C:
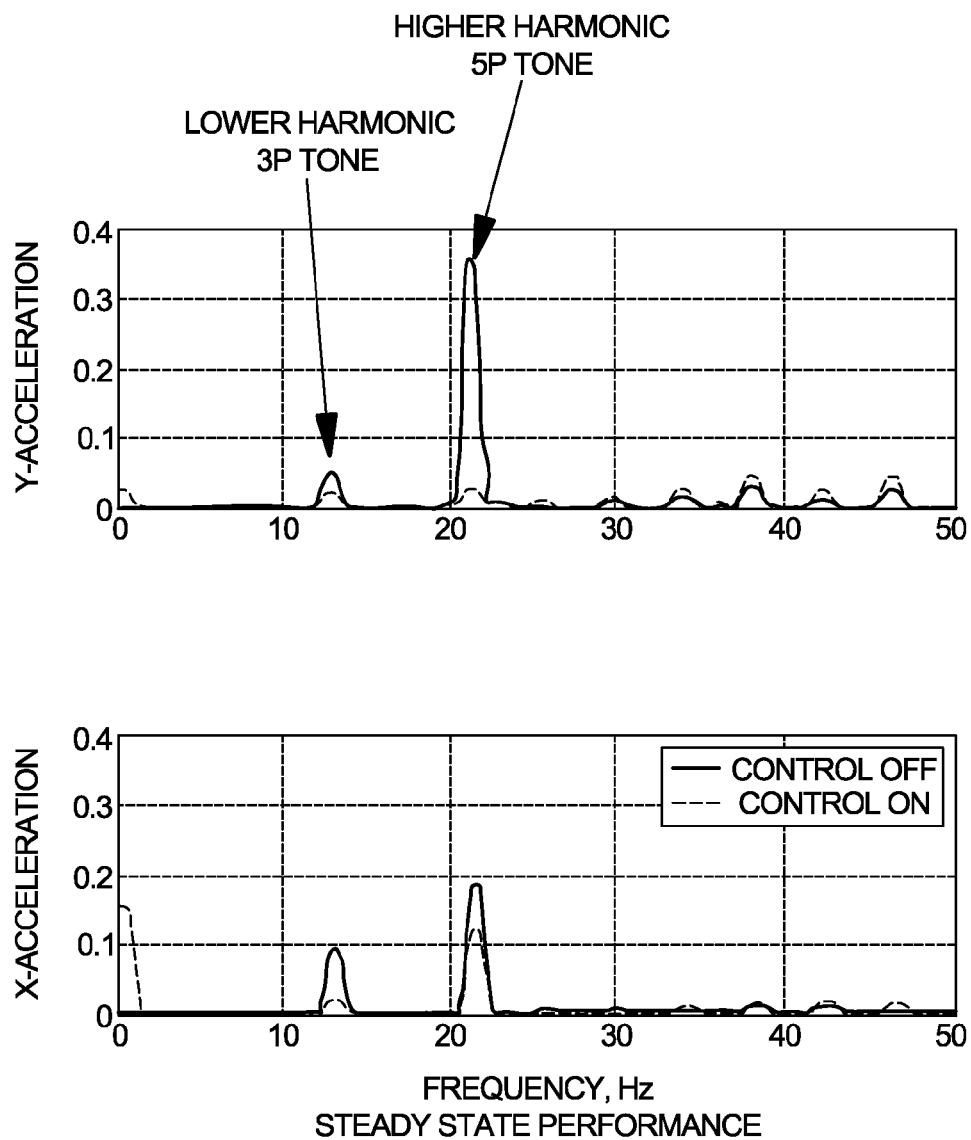

Preferably the first vibration frequency is a distinct rotating frame lower harmonic frequency from the second vibration frequency higher harmonic, and the first imbalance mass concentration rotor and the second imbalance mass concentration rotor is driven and controlled independently from the third imbalance mass concentration rotor and the fourth imbalance mass concentration rotor, preferably with the first imbalance mass concentration rotor and the second imbalance mass concentration rotor driven to rotate opposite of the hub assembly and the third and fourth rotors. Preferably the first vibration frequency lower harmonic is a distinct lower harmonic frequency 3P tone from the second vibration frequency higher harmonic 5P tone with respect to the 1P rotating frame. FIG. 5A-C show simulated test data showing with the vibration control on the system inhibited the two distinct frequencies; the test was simulated using a stationary helicopter body and rotor hub with vibrations inputted into the rotor hub using controlled linear actuator disturbance force generators to simulate the in-flight helicopter rotating hub vibrations.

Preferably the first vibration frequency is a distinct lower harmonic frequency tone from the second vibration frequency tone, and the first imbalance mass concentration rotor rotational position control and the second imbalance mass concentration rotor rotational position control is segregated from the third imbalance mass concentration rotor rotational position control and the fourth imbalance mass concentration rotor rotational position control. Preferably the first imbalance mass concentration rotor rotational position control and the second imbalance mass concentration rotor rotational position control is segregated from the third imbalance mass concentration rotor rotational position control and the fourth imbalance mass concentration rotor rotational position control, preferably with the electronics control system 50 comprised of separate subsystems 50', 50".

Figure 6A:
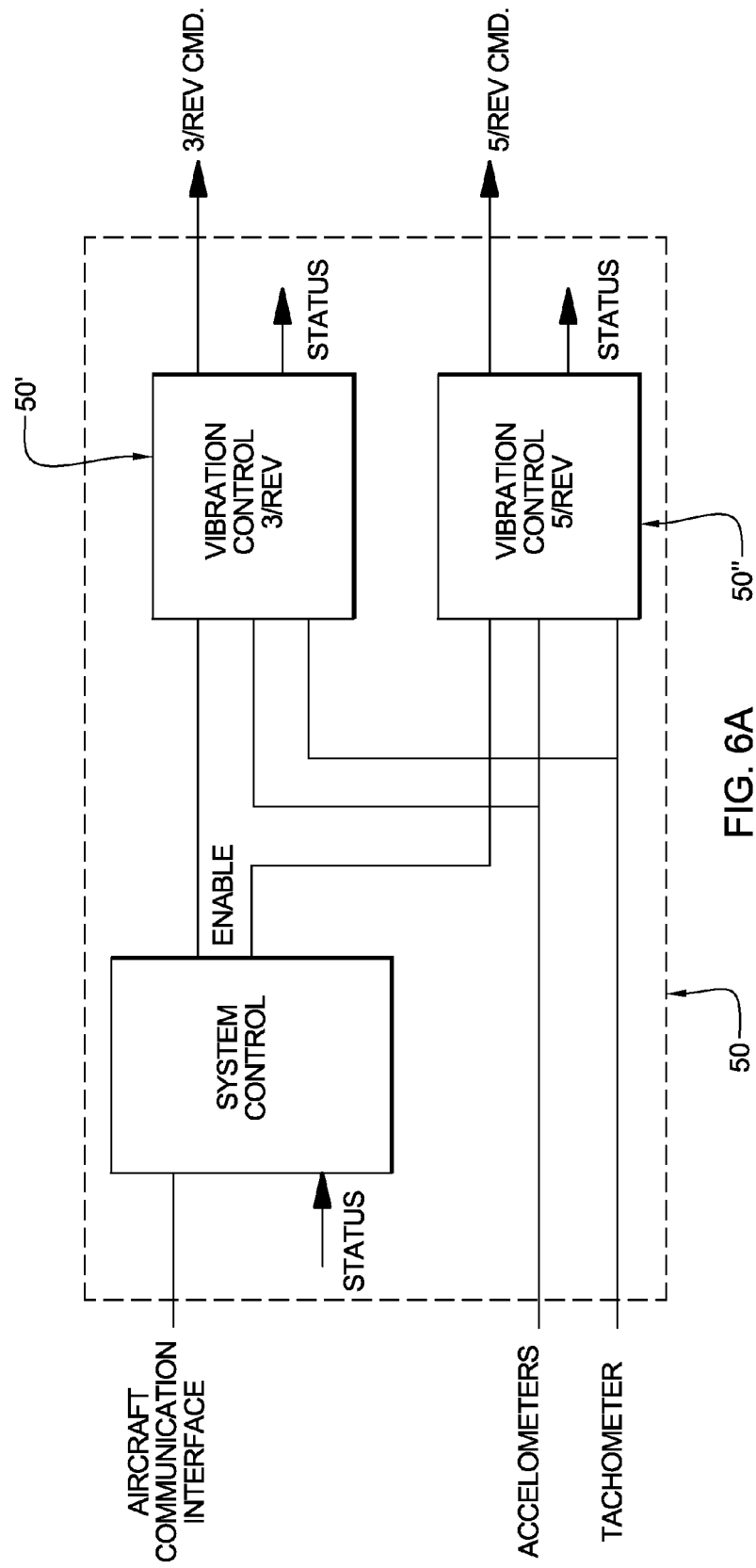
FIG. 6A-B illustrate a vibration control system with a tachometer input and a first rotation speed rotors stage VC (Vibration Control) controller for controlling a first imbalance mass concentration rotor rotational position and a second imbalance mass concentration rotor rotational position with 3/Rev commands (3P commands) and a second rotation speed rotors stage VC (Vibration Control) controller for controlling a third imbalance mass concentration rotor rotational position and a fourth imbalance mass concentration rotor rotational position with 5/Rev commands (5P commands).

Preferably the vibration control system includes a tachometer input and a first rotation speed rotors stage VC controller for controlling the first imbalance mass concentration rotor rotational position and the second imbalance mass concentration rotor rotational position, and a second rotation speed rotors stage VC controller for controlling the third imbalance mass concentration rotor rotational position and the fourth imbalance mass concentration rotor rotational position. FIG. 6 illustrates a vibration control system with a tachometer input and a first rotation speed rotors stage VC controller for controlling the first imbalance mass concentration rotor rotational position and the second imbalance mass concentration rotor rotational position with 3/Rev commands (3P commands) to a first motor control loop, and a second rotation speed rotors stage VC controller for controlling the third imbalance mass concentration rotor rotational position and the fourth imbalance mass concentration rotor rotational position with 5/Rev commands (5P commands) to a second motor control loop.

Preferably the vibration control system includes a first rotation speed electronics control system subsystem 50' for controlling the first imbalance mass concentration rotor rotational position and the second imbalance mass concentration rotor rotational position, and a second rotation speed electronics control system subsystem 50" for controlling the third imbalance mass concentration rotor rotational position and the fourth imbalance mass concentration rotor rotational position. Preferably the vibration control system first rotation speed electronics control system subsystem 50' is a first rotation speed rotors 3P stage VC controller for controlling the first imbalance mass concentration rotor rotational position and the second imbalance mass concentration rotor rotational position, and the second rotation speed electronics control system subsystem 50" is a second rotation speed rotors 5P stage VC controller for controlling the third imbalance mass concentration rotor rotational position and the fourth imbalance mass concentration rotor rotational position.

Preferably the vibration control system includes a fault mode control protocol for controlling a rotation of the rotors during a sensed failure of the rotating assembly vibration control system, preferably with the system braking a failed rotor.

Preferably the first imbalance mass concentration is opposingly oriented to the second imbalance mass concentration during a first starting stopping rotation speed less than the first rotation speed and the third imbalance mass concentration is opposingly oriented to the fourth imbalance mass concentration during a second starting stopping rotation speed less than the second rotation speed.

Figure 6B:
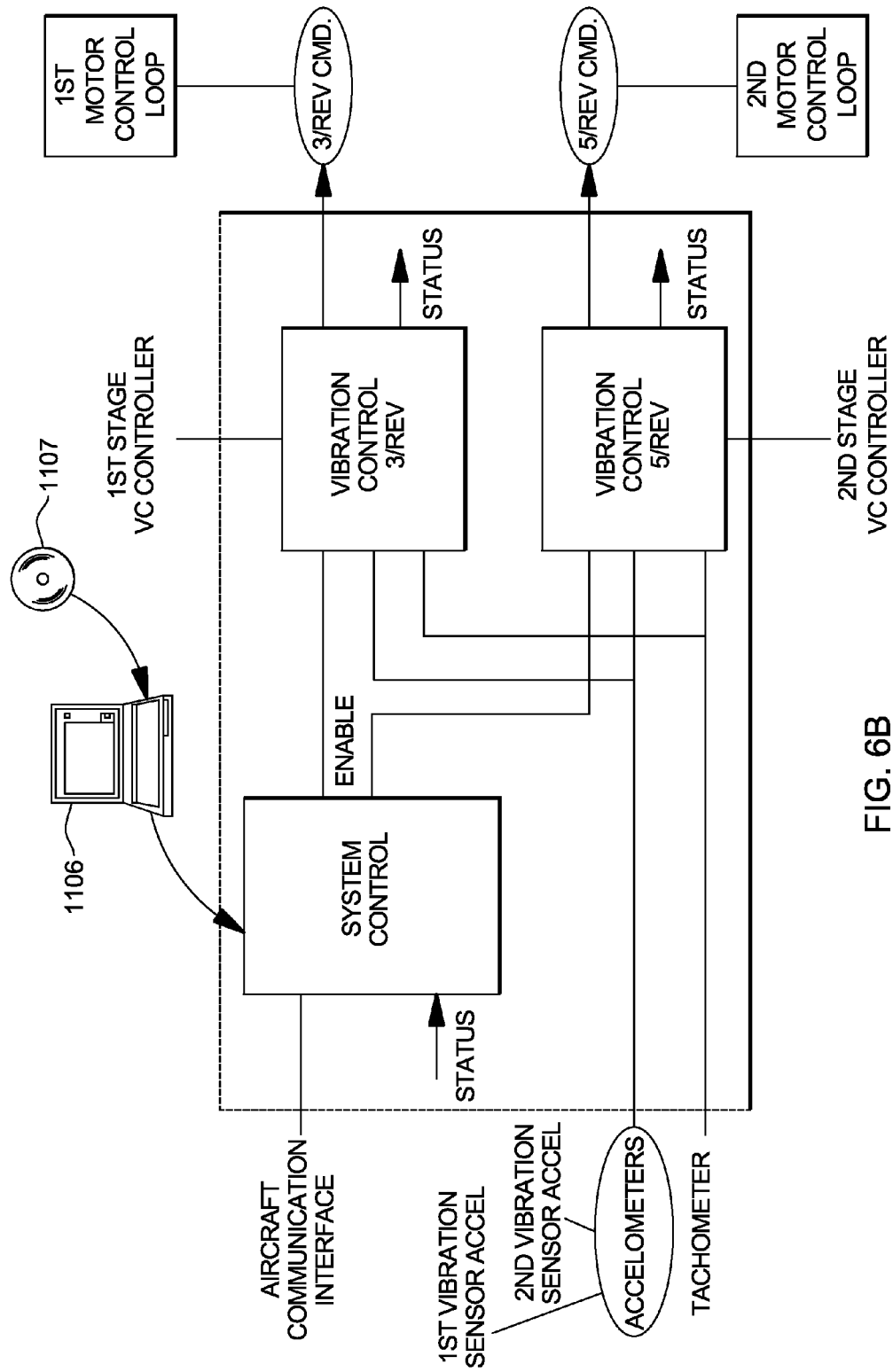

In an embodiment the invention includes a electronic control system computer program product in a storage medium for controlling a rotating vibration control system with a first imbalance mass concentration rotor, a second imbalance mass concentration rotor, a third imbalance mass concentration rotor, and a fourth imbalance mass concentration rotor. The computer program product includes a computer readable storage medium. The computer program product includes first program instructions for driving the first imbalance mass concentration rotor and the second imbalance mass concentration rotor at a first rotation speed vibration canceling rotation frequency while controlling the rotational position of the first imbalance mass concentration and the second imbalance mass concentration to produce a first net force vector to inhibit a first vibration frequency. Preferably the mass concentrations are controlled to inhibit a 3P lower harmonic. The computer program product includes second program instructions for driving the third imbalance mass concentration rotor and the fourth imbalance mass concentration rotor at a second rotation speed vibration canceling rotation frequency while controlling the rotational position of the first imbalance mass concentration and the second imbalance mass concentration separate from the controlling of the first imbalance mass concentration and the second imbalance mass concentration to produce a second net force vector to inhibit a second vibration frequency. Preferably the mass concentrations are controlled to inhibit a 5P higher harmonic. Preferably additional instructions opposingly orient the first imbalance mass concentration relative to the second imbalance mass concentration during a transitioning rotation speed, and the third imbalance mass concentration relative to the fourth imbalance mass concentration during a transitioning rotation speed. FIGS. 2A and 6B illustrate the computer program product in a storage medium 1107, such as a storage medium 1107 readable by a computer 1106 and up loadable into the electronics control system 50 and subsystems 50', 50'', with the electronics control system 50 and subsystems 50',50'' utilizing such instructions.

Preferably the computer program instructions include program instructions for calculating rotational positions of the third and fourth imbalance mass concentration rotors independently of the first and second imbalance mass concentration rotor positions.

Preferably the computer program instructions include program instructions for monitoring a tachometer input signal and maintaining an opposing orientation of the first imbalance mass concentration and the second imbalance mass concentration, and the third imbalance mass concentration relative to the fourth imbalance mass concentration during transitioning rotation speeds.

Preferably a fault mode control protocol for controlling a rotation of the rotors during a sensed failure of the rotating vibration control system is included. Preferably the fault mode control protocol includes instructions for braking a failed rotor of a sensed failure. Preferably the fault mode control protocol includes monitoring a sensor signal and detecting a first rotor failure. Preferably the fault mode control protocol includes monitoring a sensor signal and detecting a second rotor failure. Preferably the fault mode control protocol includes monitoring a sensor signal and detecting a third rotor failure. Preferably the fault mode control protocol includes instructions for monitoring a sensor signal and detecting a fourth rotor failure.

Preferably the computer instructions include instructions to monitor a plurality of sensor signals. Preferably the computer instructions include program instructions to monitor a plurality of accelerometers housed in the housing 30. Preferably the computer instructions include program instructions to monitor a plurality of position sensors housed in the housing and which sense the position of the rotors 38, 44, 38', 44', preferably Hall sensors mounted within the housing which sense magnetic targets on the rotors. Preferably the computer instructions include program instructions to monitor a plurality of fault sensors and health monitor sensors.

In an embodiment the invention includes computer program products stored in a medium for electronic control of a rotating assembly vibration control system. The computer program product preferably includes a computer readable storage medium. The computer electronic control program product including first program instructions to control a rotation of a first rotor and a rotation of a second rotor. The computer program product including second program instructions to monitor a plurality of sensor signals. The computer program product including third program instructions to control the rotation speed, rotation direction and phase of the first rotor and the rotation speed, rotation direction and phase of the second rotor to minimize a first monitored vibration frequency sensor signal. The computer program product including fourth program instructions to control a rotation of a third rotor and a rotation of a fourth rotor. The computer program product including fifth program instructions to monitor a plurality of sensor signals. The computer program product including sixth program instructions to control the rotation speed, rotation direction and phase of the third rotor and the rotation speed, rotation direction and phase of the fourth rotor to minimize a second monitored vibration frequency sensor signal.

Preferably the computer program product and system includes below speed program instructions, the below speed program instructions providing commands to opposingly orient the first rotor first imbalance mass concentration relative to the second rotor second imbalance mass concentration when the speed is below the vibration control rotation speed, preferably when starting and stopping the system. Preferably the computer program product and system includes below speed program instructions, the below speed program instructions providing commands to opposingly orient the third rotor first imbalance mass concentration relative to the fourth rotor second imbalance mass concentration when the speed is below the vibration control rotation speed, preferably when starting and stopping the system.

In an embodiment the invention includes a rotating vibration control system for a rotating assembly having at least a first vibration frequency operational vibration and at least a second vibration frequency operational vibration. The rotating vibration control system includes a first rotor with a first imbalance mass concentration, the first rotor driven to rotate at a first rotation speed greater than an operational rotation frequency of the rotating assembly, preferably in a counter rotating direction, with rotation opposing rotation of the rotating assembly. The rotating vibration control system includes a second rotor with a second imbalance mass concentration, the second rotor driven to rotate at the first rotation speed greater than an operational rotation frequency of the rotating assembly, preferably in the counter rotating direction, opposing the rotation of the rotating assembly. The rotating vibration control system includes a third rotor with a third imbalance mass concentration, the third rotor driven to rotate at a second rotation speed greater than an operational rotation frequency of the rotating assembly, preferably in a co-rotating direction, rotating with the rotation of the rotating assembly. The rotating vibration control system includes a fourth rotor with a fourth imbalance mass concentration, the fourth rotor driven to rotate at the second rotation speed greater than an operational rotation frequency of the rotating assembly in the co-rotating direction with the rotation of the rotating assembly. The rotating vibration control system includes at least a first vibration sensor for producing a plurality of first vibration sensor signals. The rotating vibration control system includes at least a second vibration sensor for producing a plurality of second vibration sensor signals. The rotating vibration control system includes a first rotor rotational position sensor, a second rotor rotational position sensor, a third rotor rotational position sensor, and a fourth rotor rotational position sensor, preferably Hall effect sensors sensing the four rotor positions. The rotating vibration control system preferably includes a first motor control loop for controlling the rotation of the first rotor and the rotation of the second rotor and receives first stage VC controller motor commands. The rotating vibration control system preferably includes a first vibration control loop first rotation speed stage VC controller for controlling rotors and providing commands to the first motor control loop to minimize the first vibration sensor signals and the second vibration sensor signals. The rotating vibration control system preferably includes a second motor control loop for controlling the rotation of the third rotor and the rotation of the fourth rotor and receives second stage VC controller motor commands. The rotating vibration control system preferably includes a second vibration control loop second rotation speed stage VC controller for controlling rotors and providing commands to the second motor control loop to minimize the first vibration sensor signals and the second vibration sensor signals. Preferably the second vibration control loop second stage VC controller commands the second motor control loop independent of the first vibration control loop first stage VC controller.

Preferably the motor control loops close a control loop around the respective motors based on respective rotor position feedback derived from the rotor rotational position sensors. Preferably the system includes a soft start stop control subsystem, the soft start stop control subsystem providing commands to opposingly orient the first imbalance mass concentration relative to the second imbalance mass concentration, and the third imbalance mass concentration opposing the fourth. Preferably the soft start stop control subsystem includes program instructions to opposingly orient the first imbalance mass concentration relative to the second imbalance mass concentration during a rotation speed ramp up, and the third imbalance mass concentration opposing the fourth. Preferably the soft start stop control subsystem includes program instructions to opposingly orient the first imbalance mass concentration relative to the second imbalance mass concentration during a rotation speed ramp down, and the third imbalance mass concentration opposing the fourth.

In an embodiment the invention includes a rotary wing aircraft rotating hub mounted vibration control system for a rotary wing hub having at least a first and a second vibration frequency while rotating at a rotary wing operational rotation frequency. The rotating hub mounted vibration control system is comprised of a system housing, the system housing attached to the rotary wing hub and rotating with the rotary wing hub at the operational rotation frequency. Preferably the housing has an electronics housing cavity subsystem and an adjacent coaxial rotor housing cavity subsystem, the rotor housing cavity subsystem containing the rotors. The housing preferably houses a first coaxial ring motor having a first rotor with a first imbalance mass concentration, a second coaxial ring motor having a second rotor with a second imbalance mass concentration. The housing preferably houses a third coaxial ring motor having a third rotor with a third imbalance mass concentration, and a fourth coaxial ring motor having a fourth rotor with a fourth imbalance mass concentration.

The housing preferably houses an electronics control system for controlling the vibration control system, preferably with computer electronics which utilize computer medium to operate and execute program instructions from computer program products, which are storable on and loadable from computer storage mediums.

The electronics control system preferably includes a first rotation speed rotor stage VC controller electronics control subsystem for controlling a rotational position of the first imbalance mass concentration rotor and a rotational position of the second imbalance mass concentration rotor, the first rotation speed rotor stage VC controller electronics control subsystem controlling a speed and a phase of the first coaxial ring motor and the second coaxial ring motor such that the first imbalance mass concentration and the second imbalance mass concentration are directly driven at a whole number multiple vibration canceling rotation frequency greater than the operational rotation frequency wherein the first rotary wing hub vibration frequency is reduced.

The electronics control system preferably includes a second rotation speed rotor stage VC controller electronics control subsystem for controlling a rotational position of the third imbalance mass concentration rotor and a rotational position of the fourth imbalance mass concentration rotor, the second rotation speed rotor stage VC controller electronics control subsystem controlling a speed and a phase of the third coaxial ring motor and the fourth coaxial ring motor such that the third imbalance mass concentration and the fourth imbalance mass concentration are directly driven at a whole number multiple vibration canceling rotation frequency greater than the operational rotation frequency wherein the second helicopter rotary wing hub vibration frequency is reduced.

Preferably the first rotation speed rotor stage VC controller electronics control subsystem is separate from the second rotation speed rotor stage VC controller electronics control subsystem, preferably with the two subsystems controlling their rotors independently of the other rotors, preferably such that the location of the first and second rotors does not directly depend on the location of the third and fourth rotors.

Preferably the first rotation speed rotor stage VC controller electronics control subsystem is physically separate from the second rotation speed rotor stage VC controller electronics control subsystem, preferably with such stacked in at least two electronics layers, preferably the electronics are housed proximate the center axis of rotation, proximate the housing ID, and distal from the housing OD. Preferably the rotors are stacked in layers, and the electronics subsystems are stacked in layers, the electronics proximate the housing ID and the rotors proximate the housing OD.

FIG. 11 illustrates a preferred embodiment with the first rotation speed rotor stage VC controller electronics control subsystem 50' physically separate from the second rotation speed rotor stage VC controller electronics control subsystem 50", preferably with the electronics control system 50 stacked vertically from the vertically stacked first rotors stage (3P stage—rotation speed rotor stage) and the second rotors stage (5P stage—rotation speed rotor stage). As shown in FIG. 11C-E the first rotation speed rotor stage VC controller electronics control subsystem 50' is preferably physically separate from the second rotation speed rotor stage VC controller electronics control subsystem 50" with the two subsystems separated into left and right subsystems as shown with the physical dividing median between the two subsystems. Preferably the rotors are stacked in layers, and as shown in FIG. 11 the electronics control system 50 is a top layer, with the 3P stage and its stacked rotors as the next layer, and the 5P stage and its stacked rotors as the bottom layer.

In an embodiment the invention includes a method of controlling a plurality of vibration frequencies of an aircraft with a rotary hub which rotates at an operational rotation frequency. The method includes providing an annular ring housing containing a first coaxial ring motor having a first rotor with a first imbalance mass concentration, a second coaxial ring motor having a second rotor with a second imbalance mass concentration, a third coaxial ring motor having a third rotor with a third imbalance mass concentration, a fourth coaxial ring motor having a fourth rotor with a fourth imbalance mass concentration, and an electronics control system for controlling the vibration control system. Preferably the electronics control system computer electronics execute program instructions from computer program products, which are storable on and loadable from computer storage medium, the electronics control system including a first rotation speed rotor stage VC controller electronics control subsystem for controlling a rotational position of the first imbalance mass concentration rotor and a rotational position of the second imbalance mass concentration rotor, the electronics control system including a second rotation speed rotor stage VC controller electronics control subsystem for controlling a rotational position of the third imbalance mass concentration rotor and a rotational position of the fourth imbalance mass concentration rotor.

The method preferably includes securing the annular ring housing to the rotary hub such that the annular ring housing rotates at the operational rotation frequency with the rotary hub, and driving the first rotor and the second rotor at a first whole number multiple vibration canceling rotation frequency greater than the operational rotation frequency while controlling the rotational position of the first imbalance mass concentration and the second imbalance mass concentration in order to produce a first rotating net force vector to inhibit a first vibration frequency, and driving the third rotor and the fourth rotor at a second whole number multiple vibration canceling rotation frequency greater than the operational rotation frequency while controlling the rotational position of the third imbalance mass concentration and the fourth imbalance mass concentration in order to produce a second rotating net force vector to inhibit a second vibration frequency.

Preferably the first rotation speed rotor stage VC controller electronics control subsystem controls a speed and a phase of the first coaxial ring motor and the second coaxial ring motor such that the first imbalance mass concentration and the second imbalance mass concentration are directly driven at a whole number multiple vibration canceling rotation frequency greater than the operational rotation frequency wherein the first rotary wing hub vibration is reduced independent from the second rotation speed rotor stage VC controller electronics control subsystem controlling the speed and phase of the third coaxial ring motor and the fourth coaxial ring motor such that the third imbalance mass concentration and the fourth imbalance mass concentration are directly driven at a whole number multiple vibration canceling rotation frequency greater than the operational rotation frequency wherein the second helicopter rotary wing hub vibration is reduced.

Figure 7A:
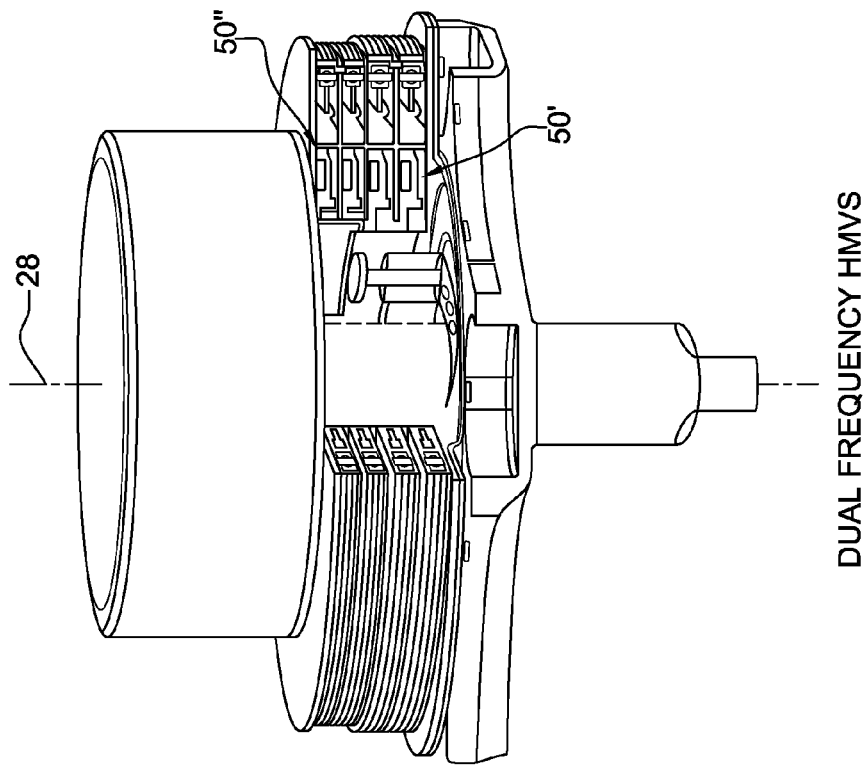
FIG. 7A-C illustrate a dual frequency (3P and 5P) Hub Mounted Vibration control System (HMVS) with the stacking of multiple imbalance rotors and motors, and separate electronics control subsystems.
Figure 8A:
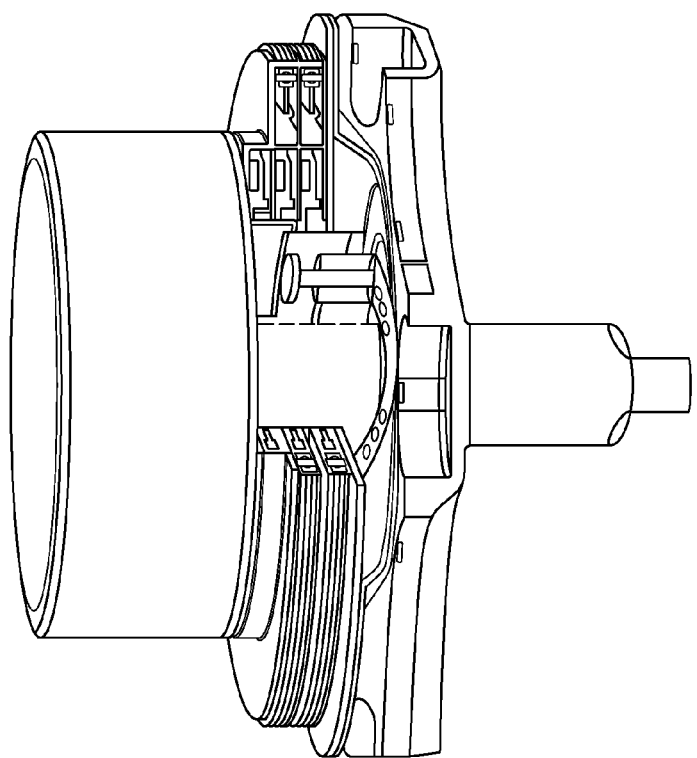
FIG. 8A-B illustrate a single frequency (3P) Hub Mounted Vibration control System (HMVS).
Figure 7B:
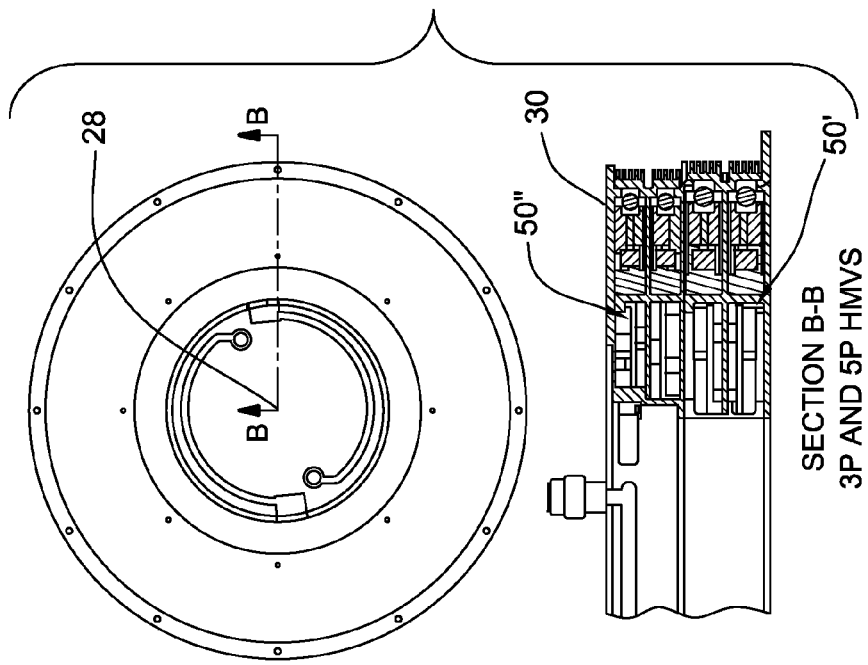
Figure 8B:
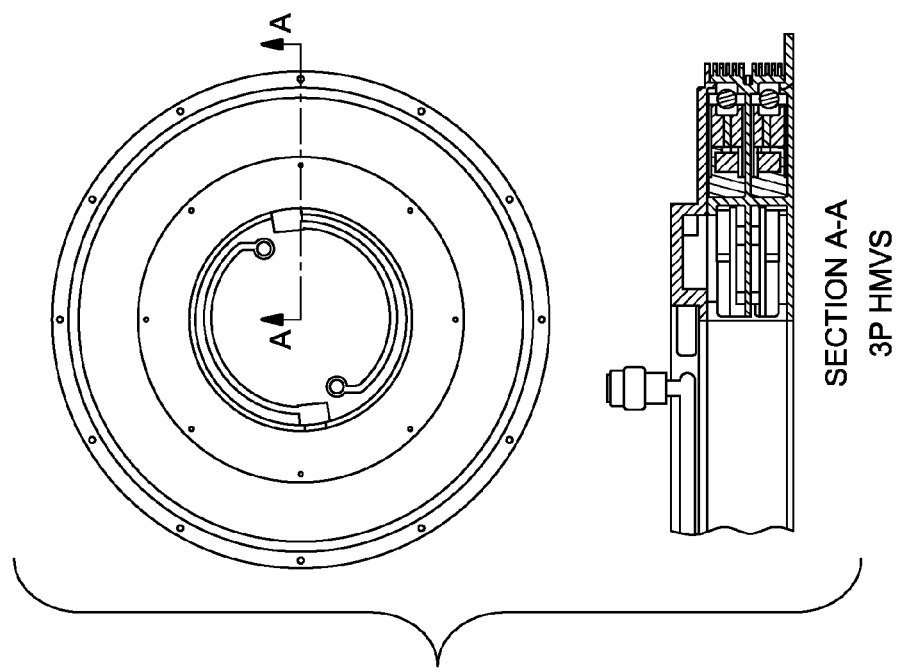
Figure 7C:
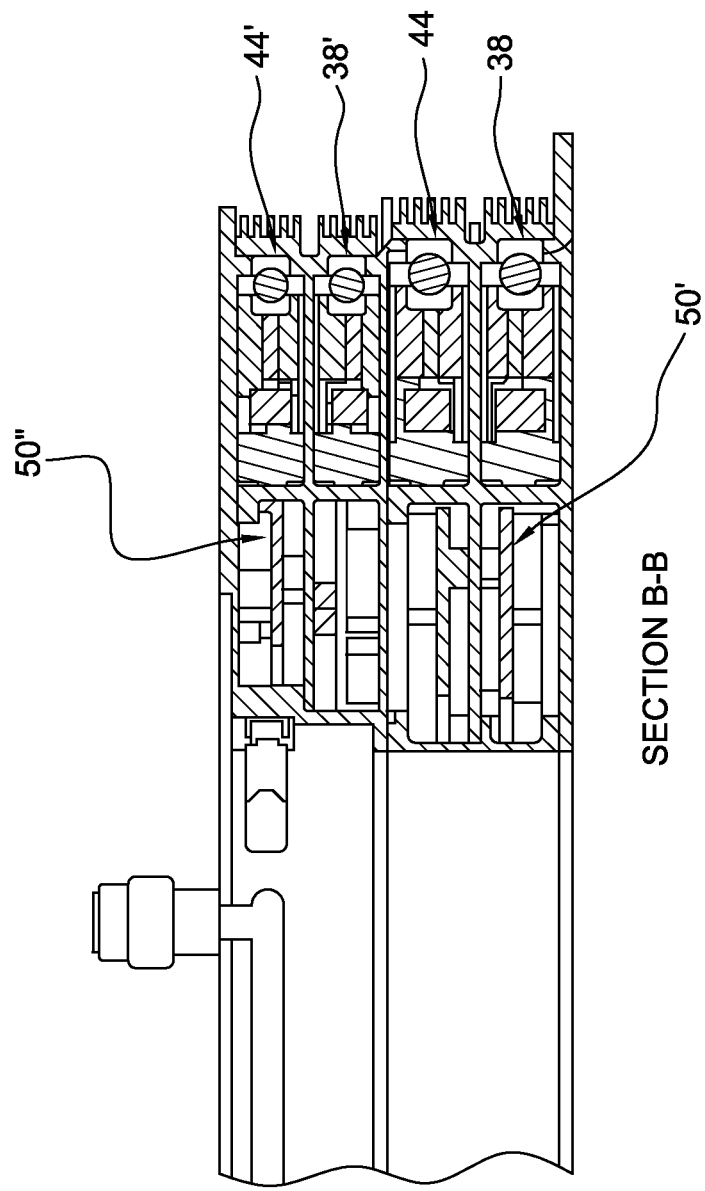
Figure 9A:
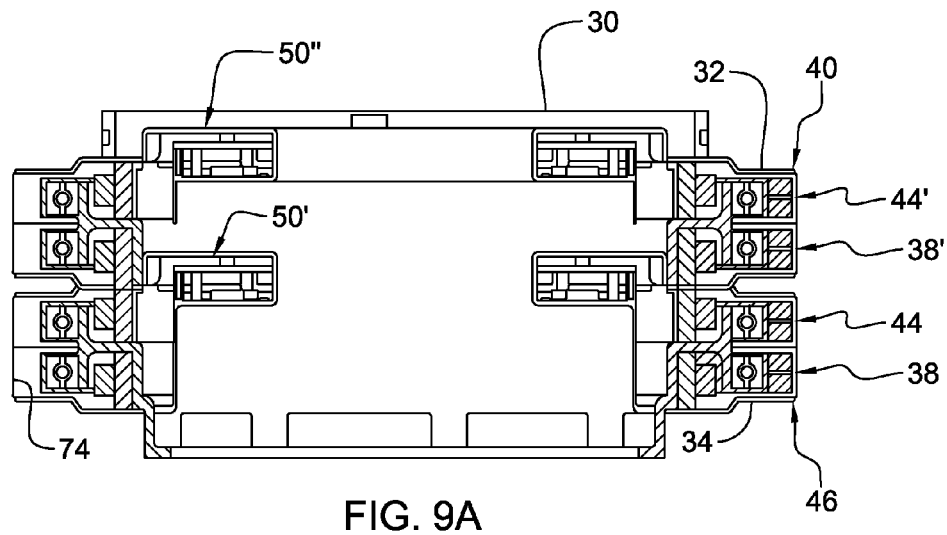
FIG. 9A-B illustrate a dual frequency Hub Mounted Vibration control System (HMVS) with the stacking of multiple imbalance rotors and motors, and separate electronics control subsystems.
Figure 9B:
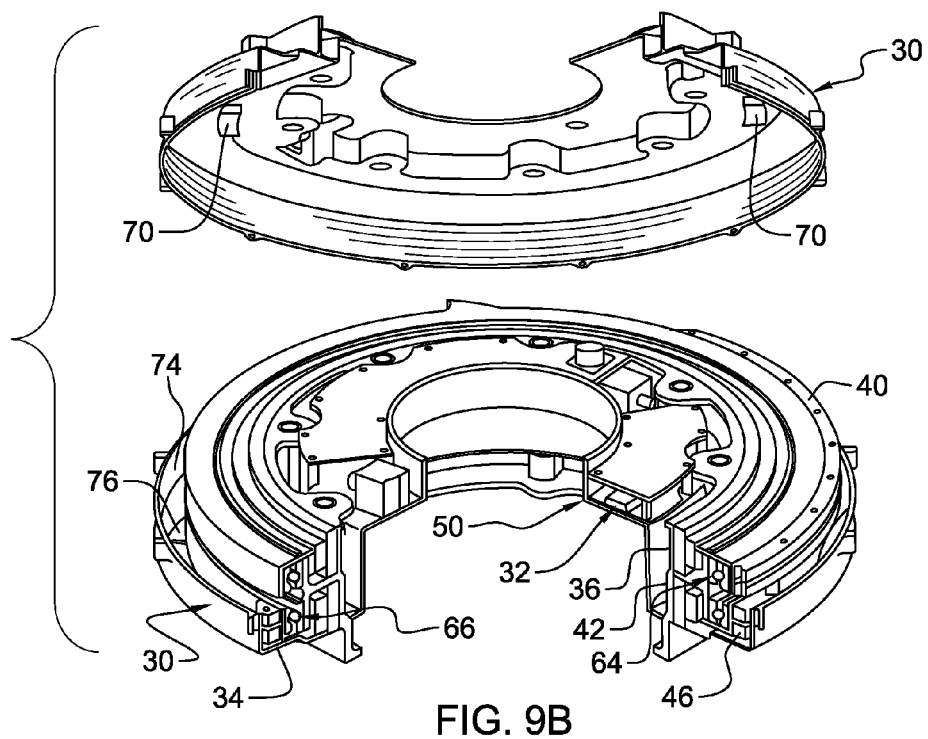
Figure 10A:
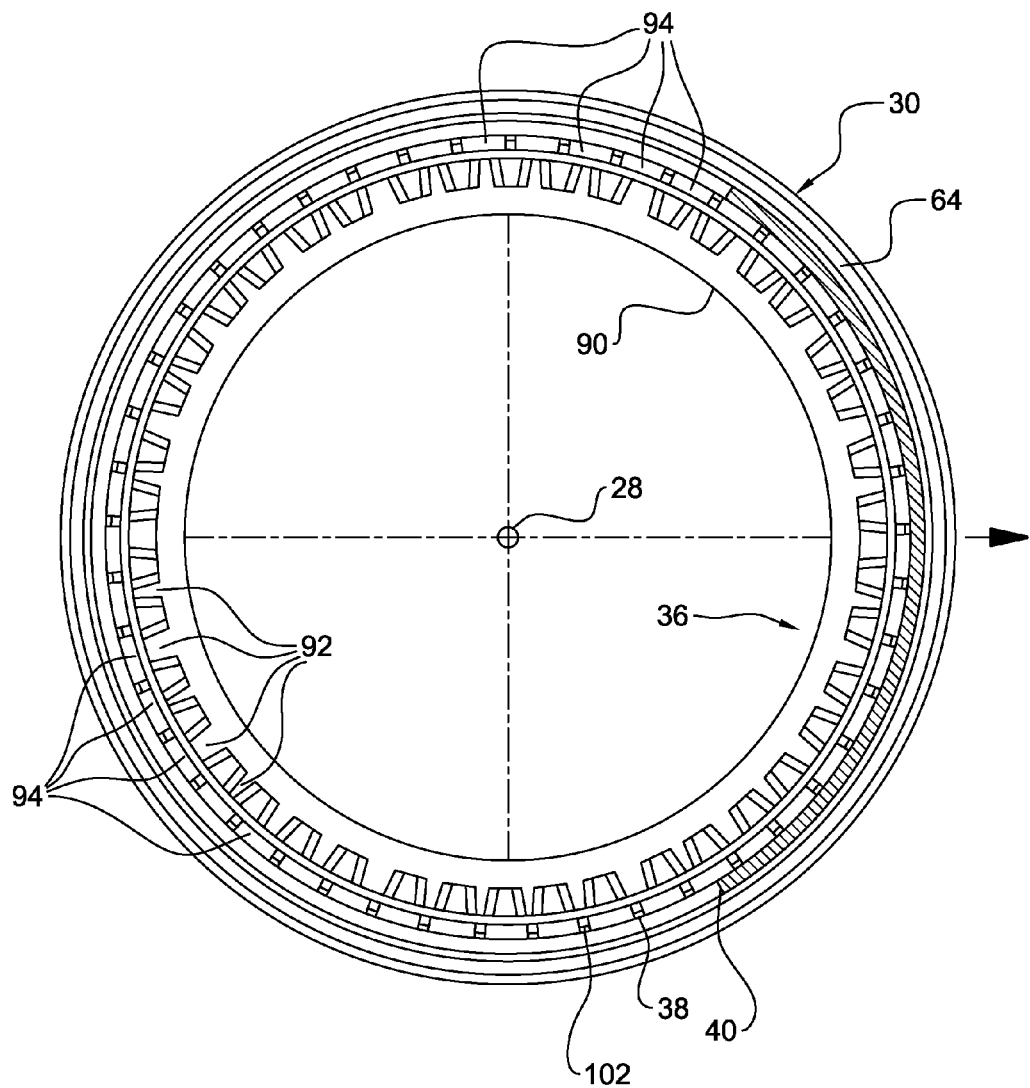
FIGS. 10A-C illustrate helicopter rotating hub mounted vibration control methods/systems with directly driven imbalance mass concentration rotors.
Figure 10B:
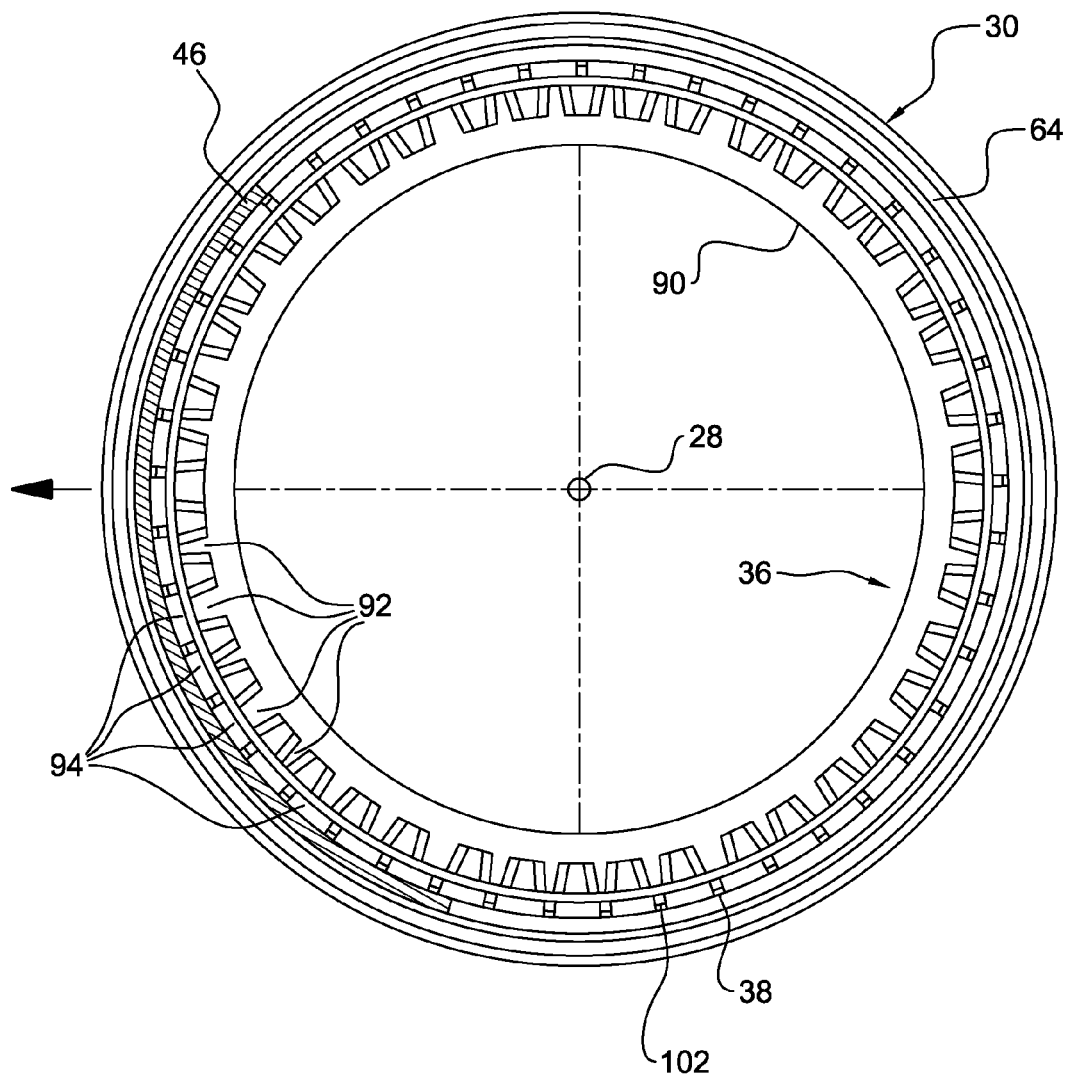
Figure 10C:
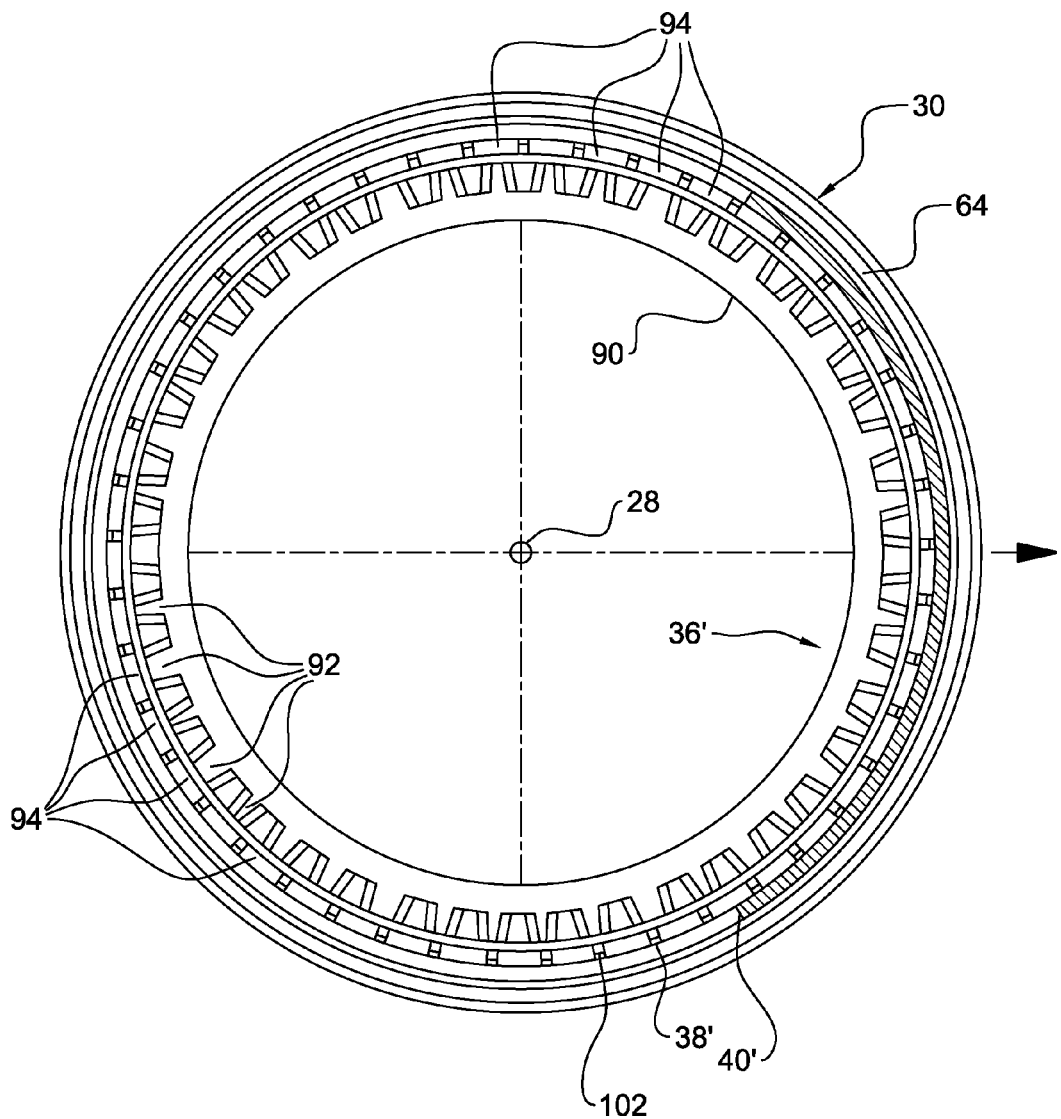
Figure 10D:
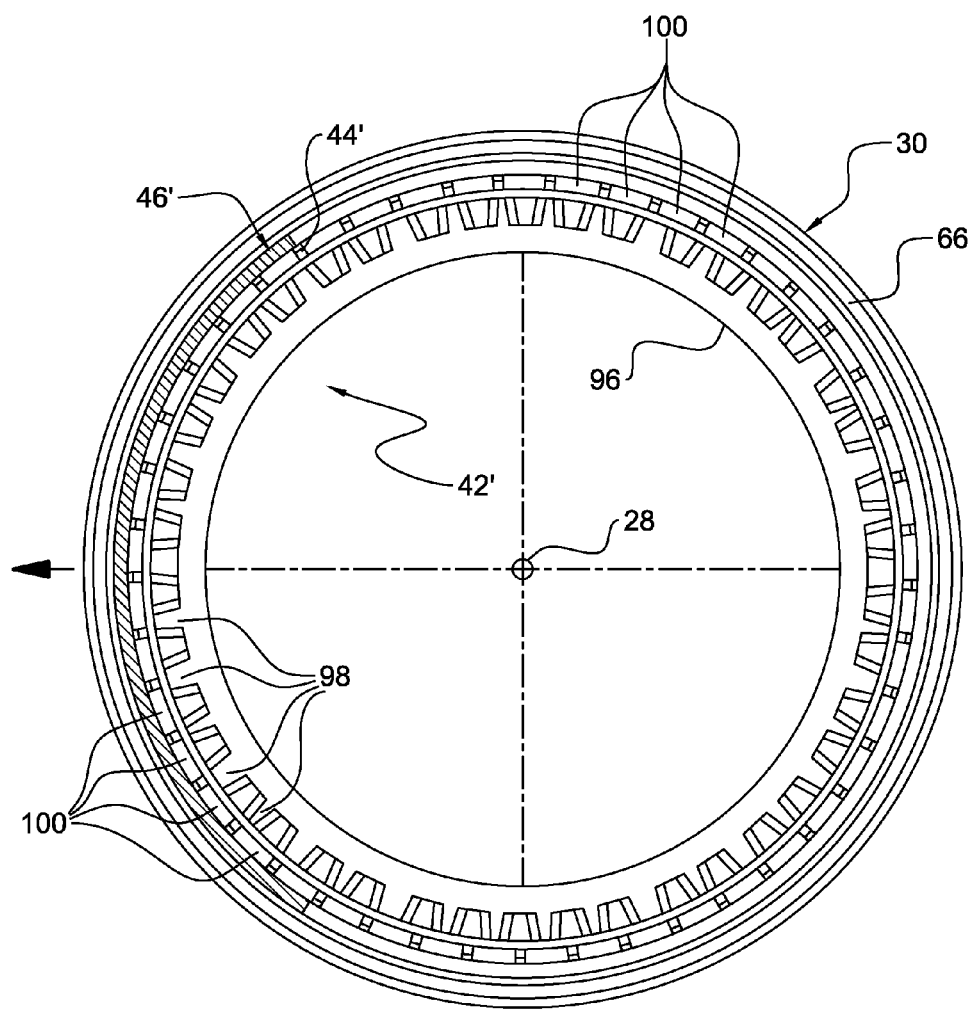
FIG. 10D illustrates a helicopter rotating hub mounted vibration control method/system with a fourth motor and a fourth imbalance rotor eccentric mass concentration.
Figure 11A:
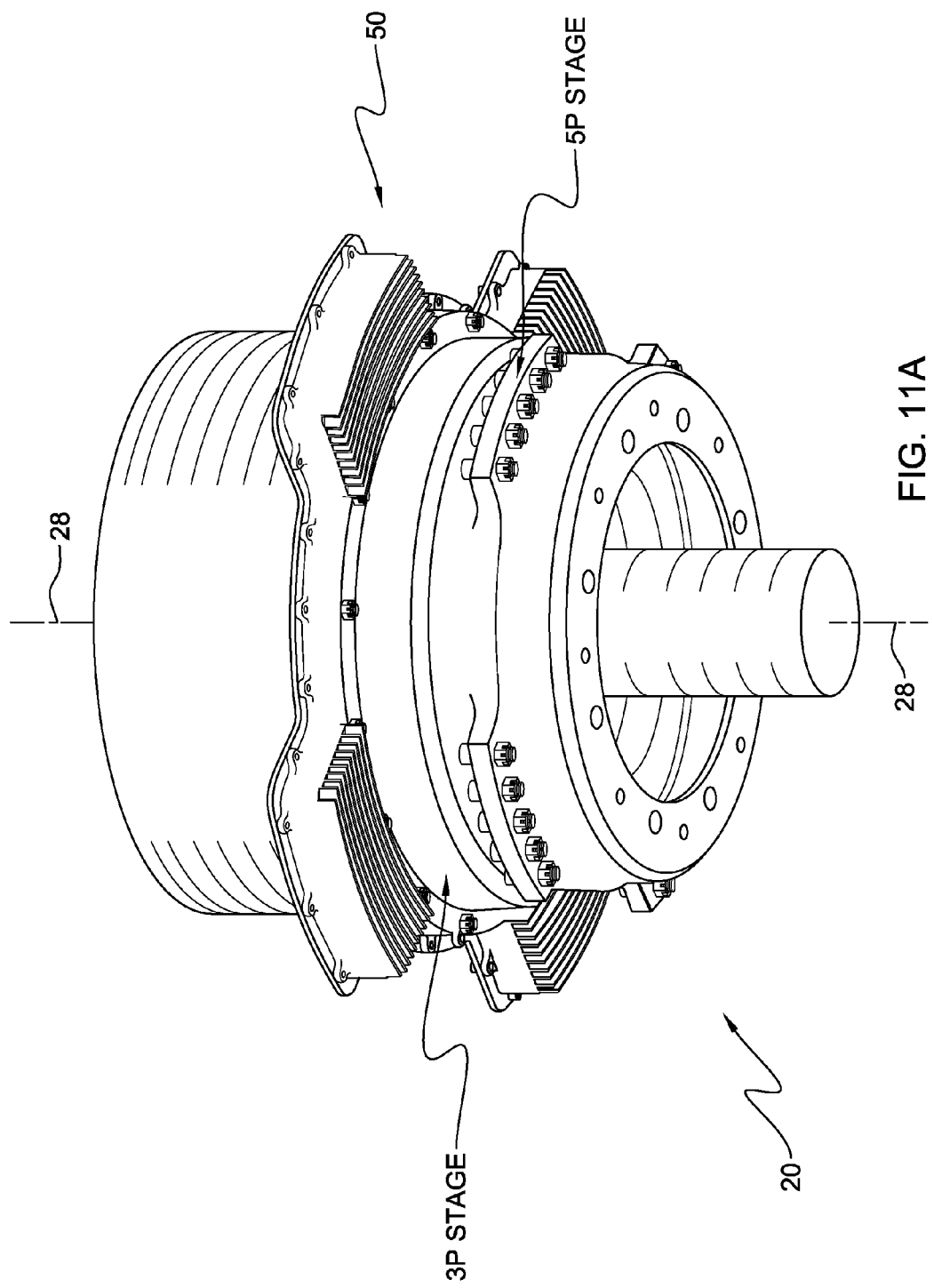
FIGS. 11A-B illustrate a dual frequency (3P and 5P) Hub Mounted Vibration control System (HMVS) with the first rotation speed rotor stage VC controller electronics control subsystem physically separate from the second rotation speed rotor stage VC controller electronics control subsystem.
Figure 11B:
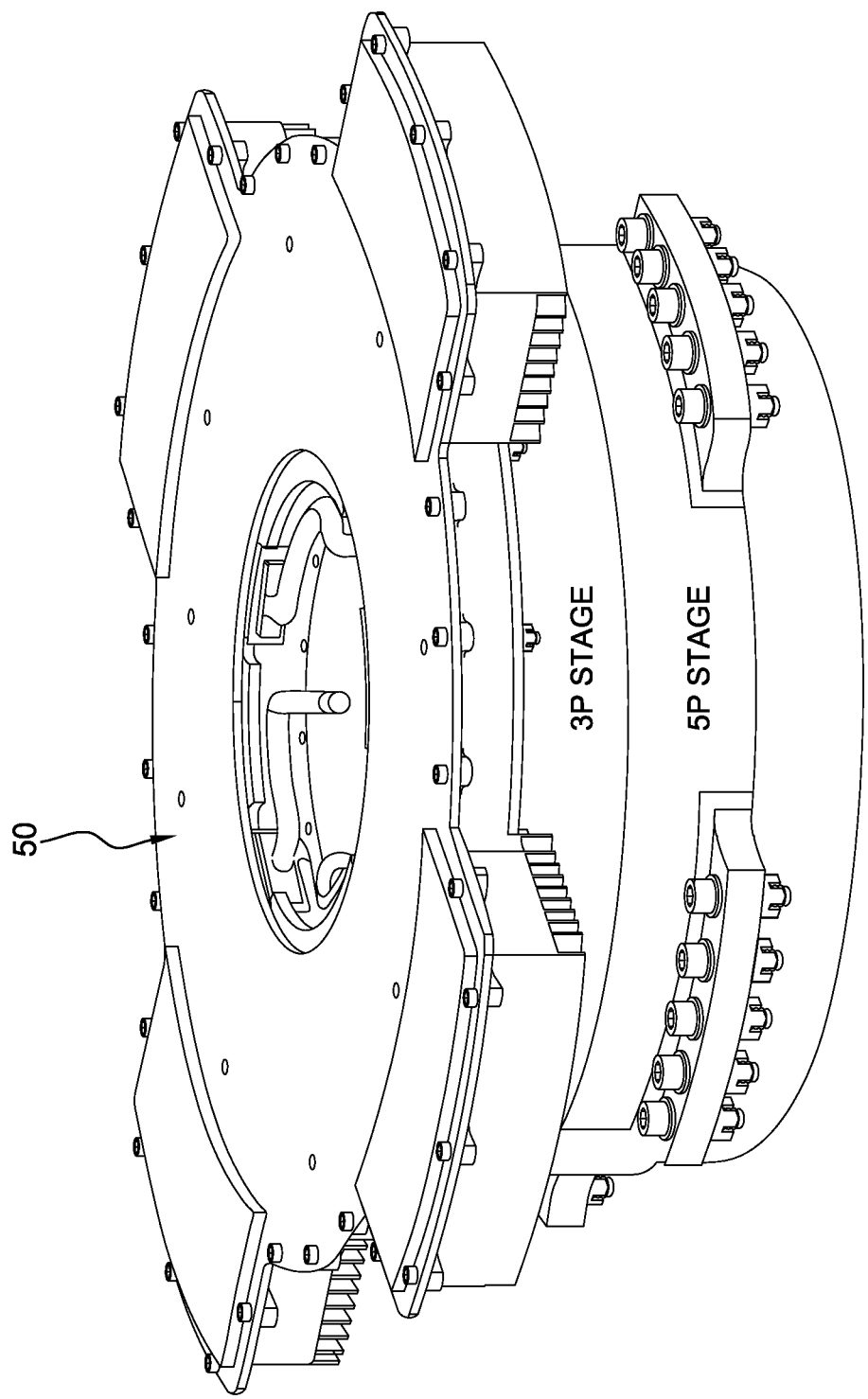
Figure 11C:
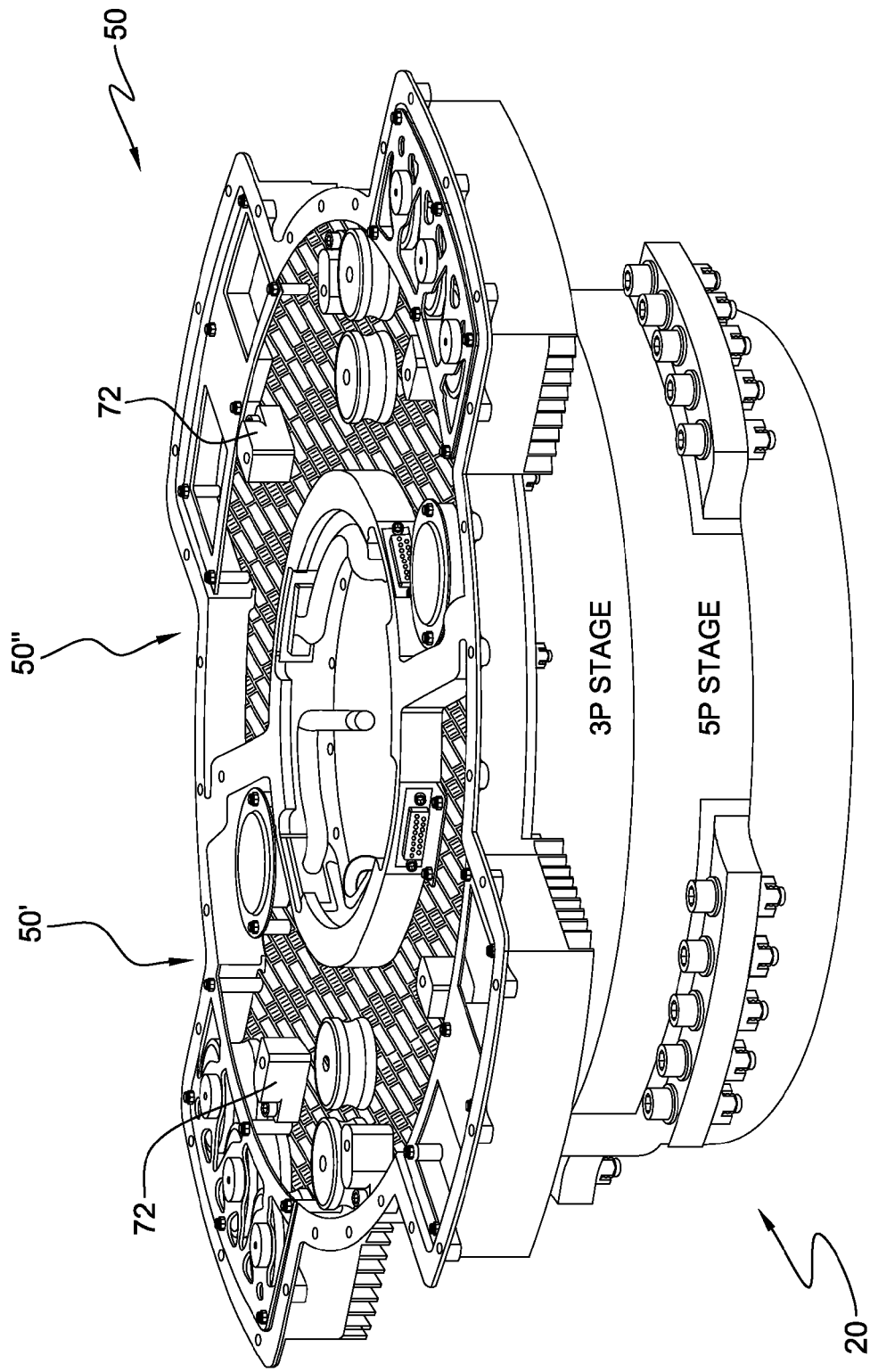
FIGS. 11C-E illustrate the first rotation speed rotor stage VC controller electronics control subsystem being physically separated into left and right subsystems.
Figure 11D:
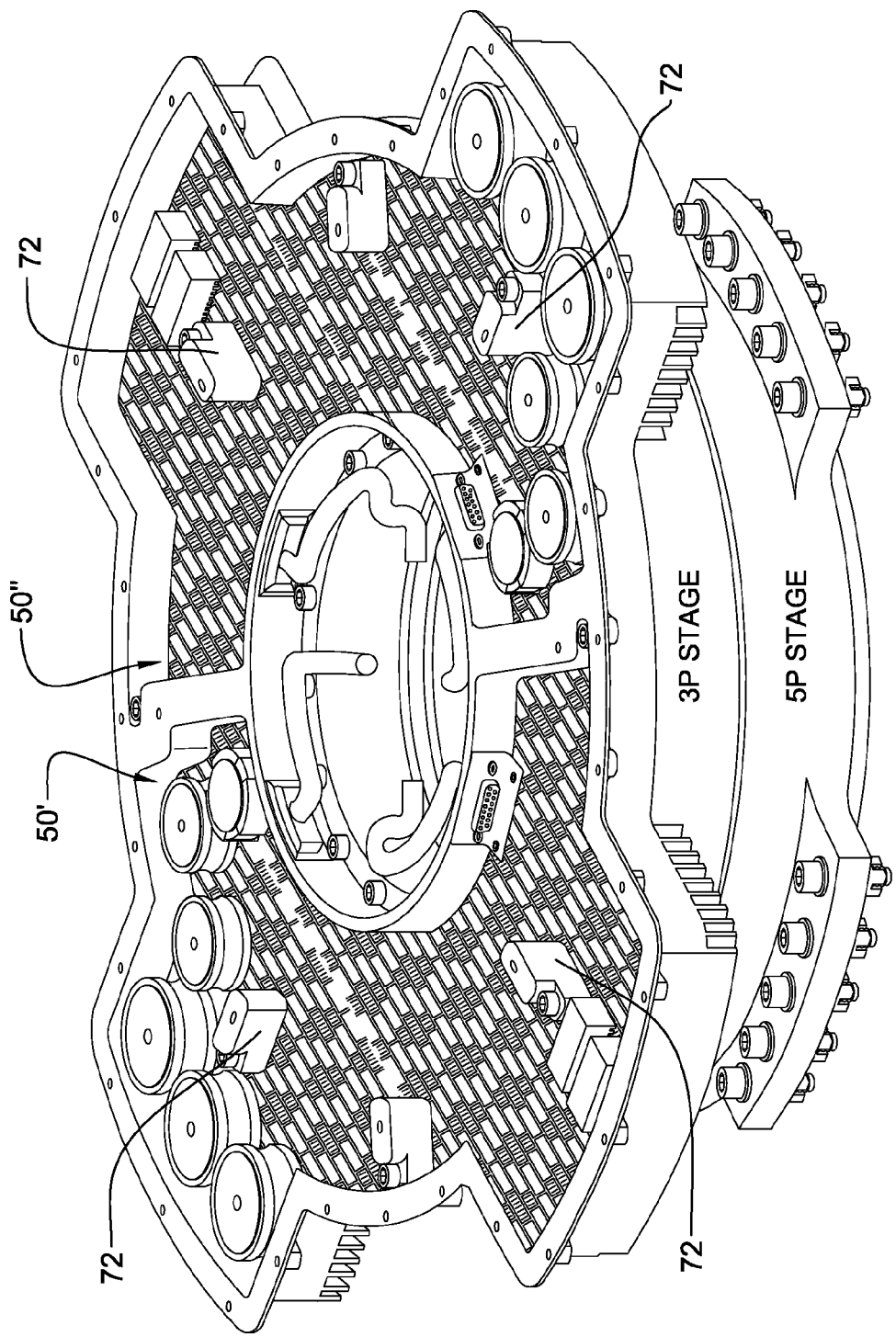
Figure 11E:
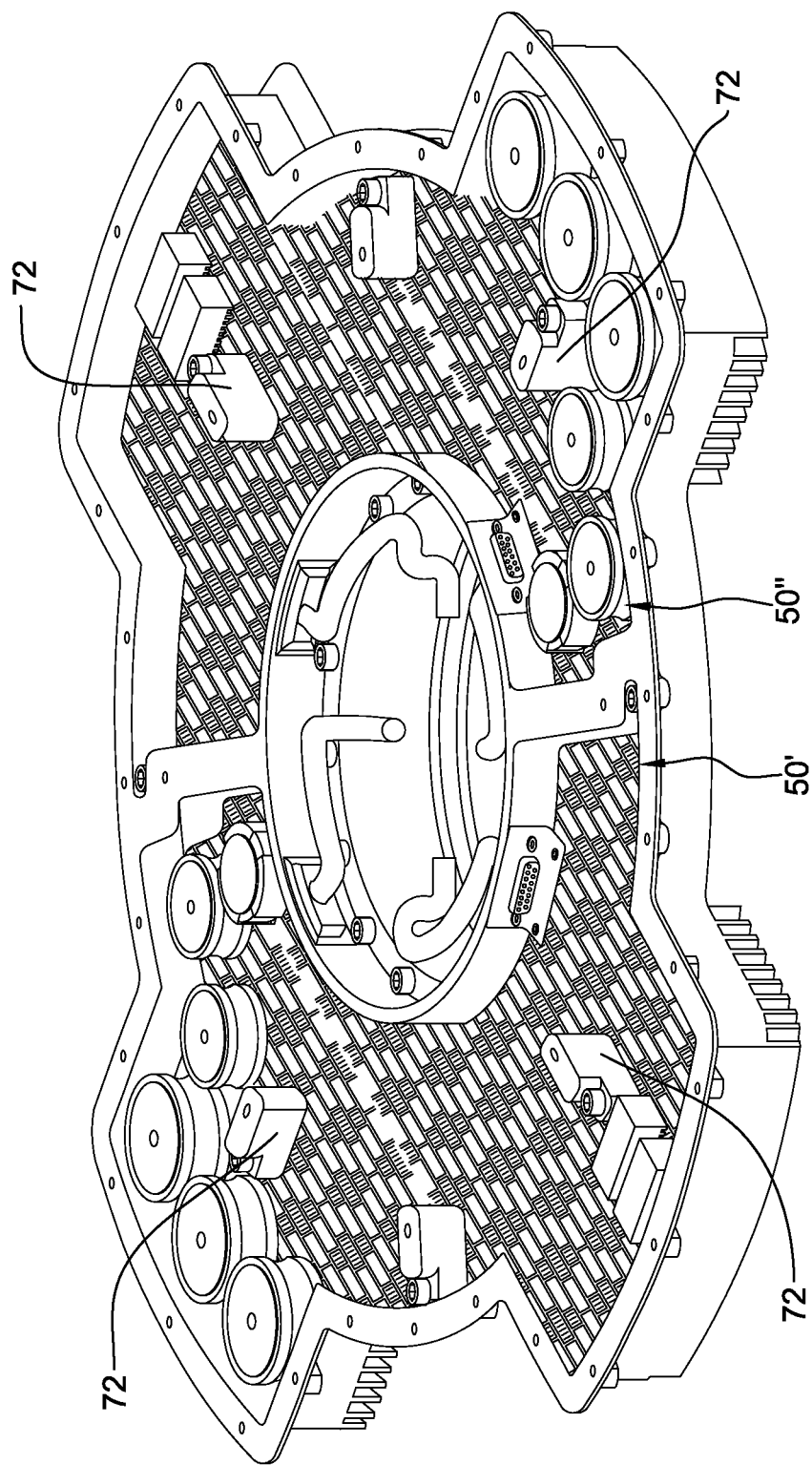
Figure 12A:
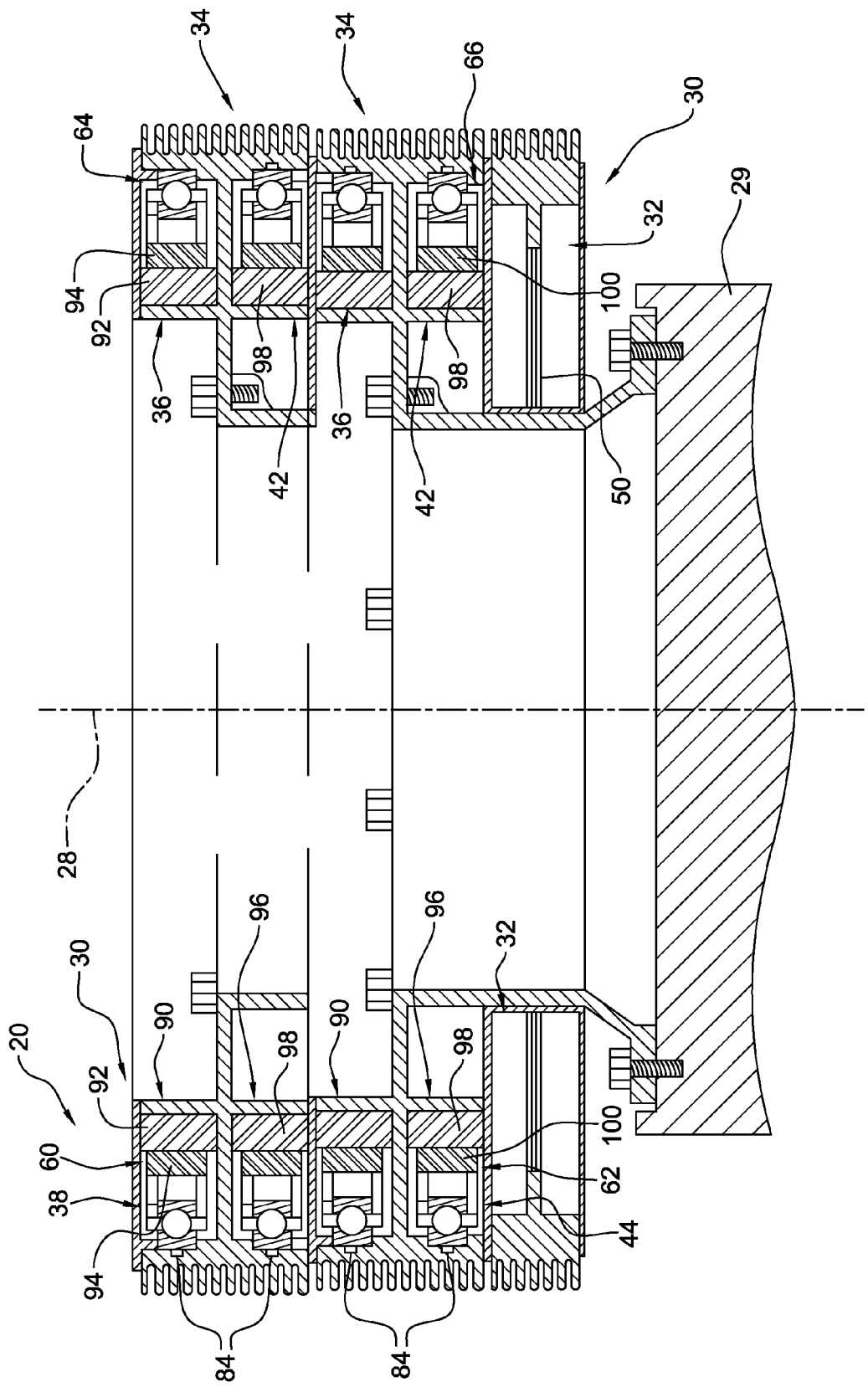
FIG. 12A-B illustrate a helicopter rotating hub mounted vibration control systems with stacked rotors.
Figure 12B:
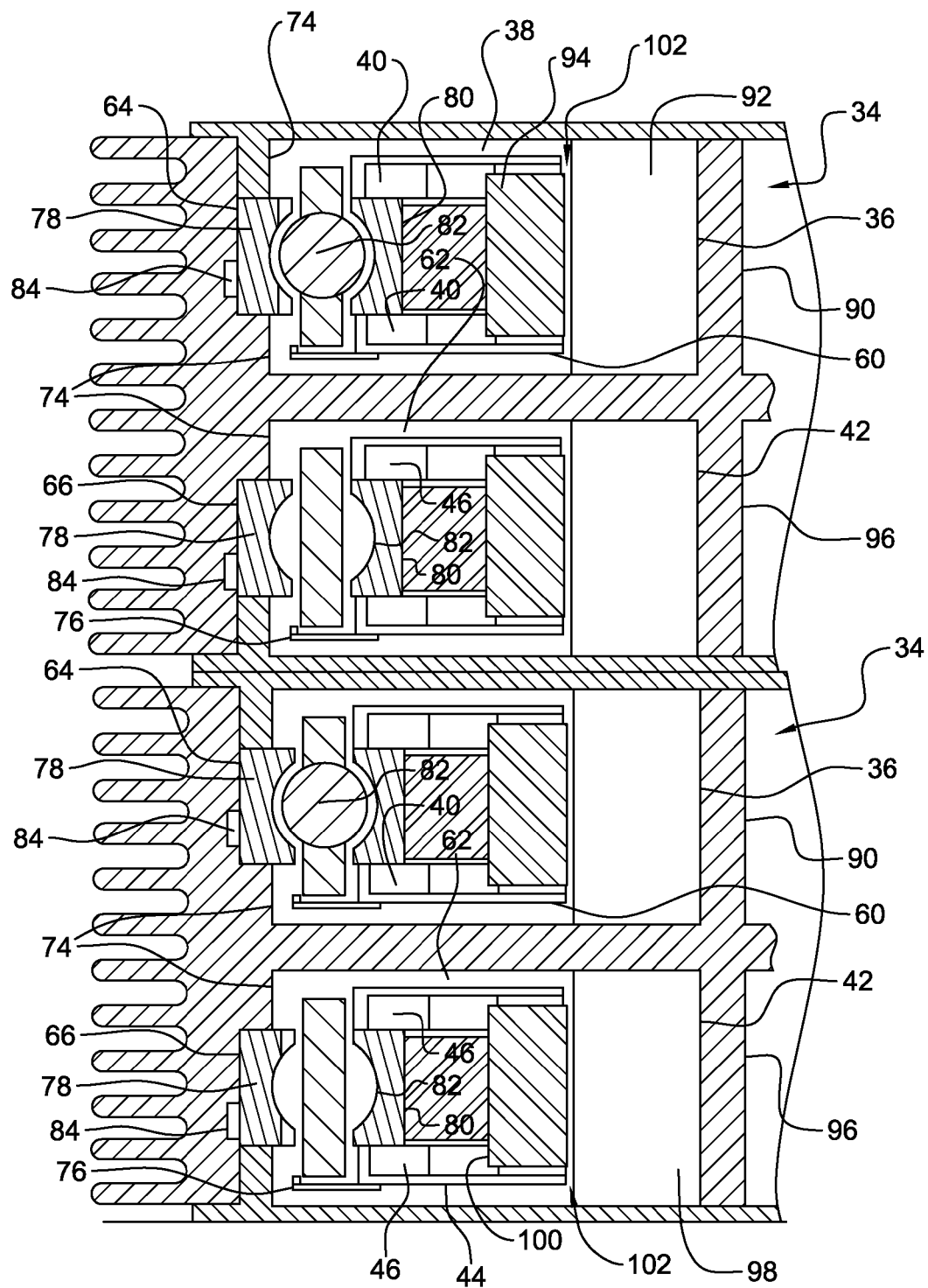
Figure 13:
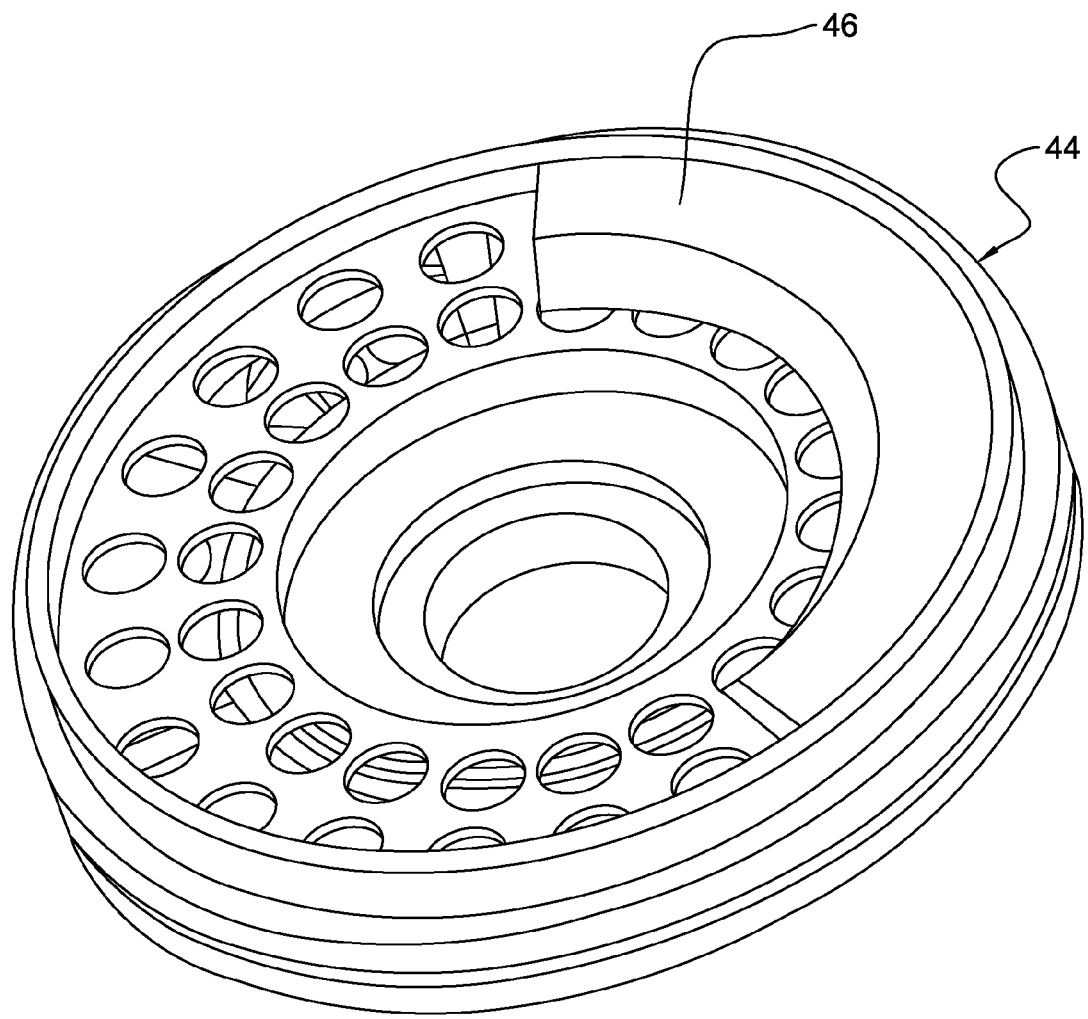
FIG. 13 illustrate helicopter rotating hub mounted vibration control system imbalance rotors with imbalance mass concentrations.
Figure 14:
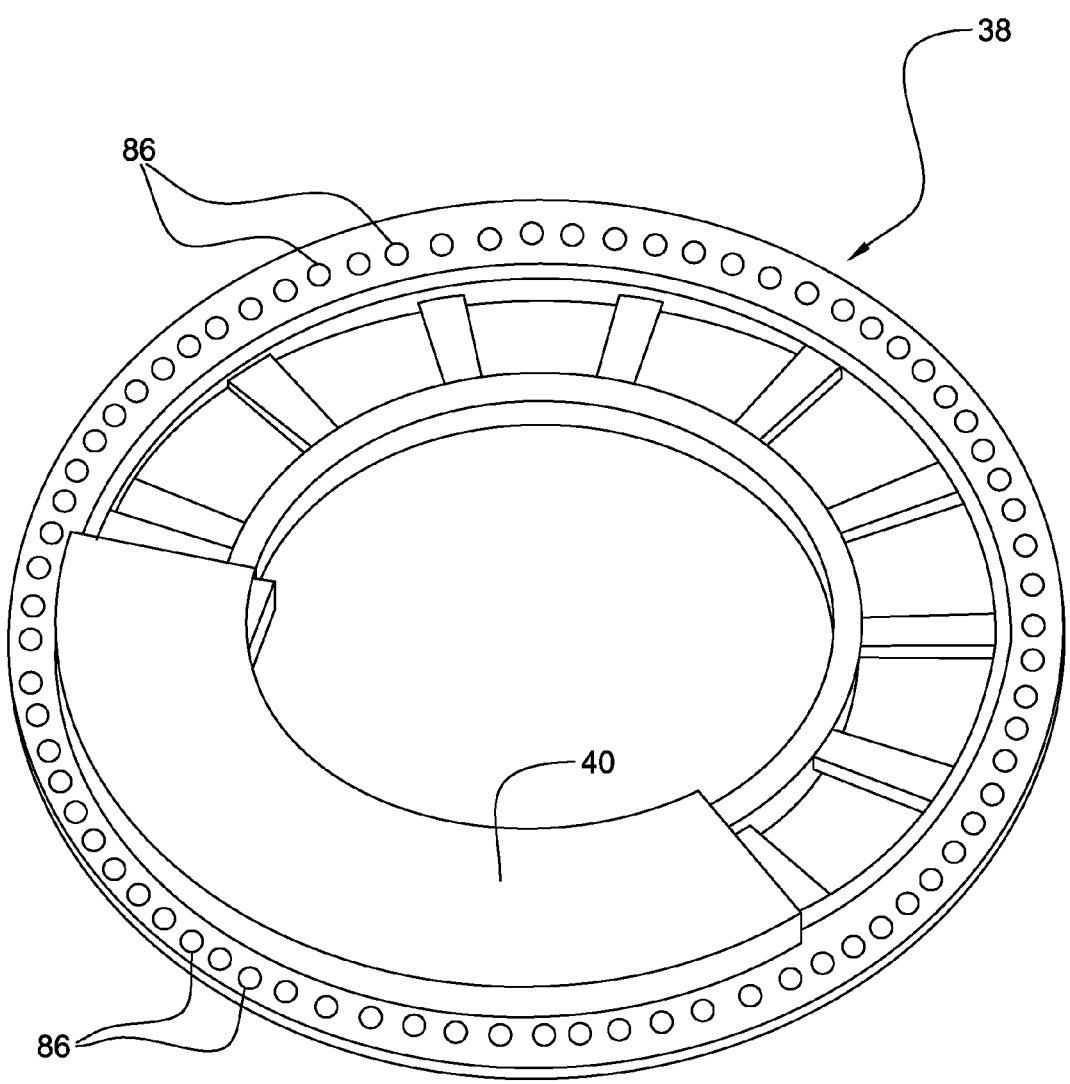
FIG. 14 illustrate helicopter rotating hub mounted vibration control system imbalance rotors with imbalance mass concentrations.

FIGS. 7 and 8 illustrate embodiments of the invention. FIG. 7A-C show the stacking of the imbalance rotors and motors, and the stacking of the separate electronics control subsystems 50', 50". Preferably the stages are vertically stackable and separate, preferably with the electronics controls proximate the axis 28 and the housing ID and the rotor imbalance masses proximate the housing OD and distal from the axis 28. As a comparison between FIGS. 7 and 8 shows, the vertically stackable stages are preferably separate, and in a preferred embodiment the first stage is usable solely and separate as shown in FIG. 8. FIG. 9A-B illustrates another embodiment of the invention with the stacking of the stages. FIG. 9B illustrates an embodiment of sensing the position of rotors and the imbalance mass with sensors 70, contained within the housing 30, with the sensors 70 position and mounted to provided position information regarding the rotational position of the imbalance mass being controlled. In an embodiment an inner motor control loop closes a control loop around the motors driving the rotors based on rotor motor position feedback derived from motor position sensors 70, preferably from the rotor magnetic encoder rotor position sensor read heads 70, preferably a Hall sensor. The inner loop servos the position of the motor to track commands sent from the vibration control stage VC controller such as the Rev Cmd. In FIG. 6. preferably these commands are in the form of a phase with respect to the provided tachometer signal input. FIG. 10A-D illustrate embodiments of the invention. FIG. 10A shows a first motor 36 with first imbalance rotor 38 with first imbalance rotor eccentric mass concentration 40. FIG. 10B shows a second motor 42 with second imbalance rotor 44 with second imbalance rotor eccentric mass concentration 46. FIG. 10C shows a third motor 36' with third imbalance rotor 38' with third imbalance rotor eccentric mass concentration 40'. FIG. 10D shows a fourth motor 42' with fourth imbalance rotor 44' with fourth imbalance rotor eccentric mass concentration 46'. FIG. 11 illustrates an embodiment of an electronics control system 50 for housing in the annular housing, with the electronics control system 50 circuit board including orthogonally positioned accelerometers 72, with the vibration sensor accelerometer hardware 72 providing orthogonal acceleration vibration signals. FIG. 12A-B illustrates another embodiment of the invention with the stacking of the rotor stages. In FIG. 12A the electronics control system 50 is shown stacked below the lower rotor. FIG. 13-14 illustrate further embodiments of imbalance rotors with imbalance mass concentrations.

In an embodiment the invention includes the computer system for controlling the rotating vibration control system with the first imbalance mass concentration rotor, the second imbalance mass concentration rotor, the third imbalance mass concentration rotor, and the fourth imbalance mass concentration rotor, the system driving the first imbalance mass concentration rotor and the second imbalance mass concentration rotor at a first rotation speed vibration canceling rotation frequency while controlling the rotational position of the first imbalance mass concentration and the second imbalance mass concentration to inhibit a first vibration frequency. The system further driving the third imbalance mass concentration rotor and the fourth imbalance mass concentration rotor at a second rotation speed vibration canceling rotation frequency while controlling the rotational position of the third imbalance mass concentration and the fourth imbalance mass concentration separate from the controlling of the first imbalance mass concentration and the second imbalance mass concentration to inhibit a second vibration frequency. The system preferably calculates rotational positions of the third and fourth imbalance mass concentration rotors independently of the first and second imbalance mass concentration rotors. The system preferably maintains an opposing orientation of the first imbalance mass concentration and the second imbalance mass concentration. The system preferably includes a fault mode control protocol for controlling a rotation of the rotors during a sensed failure of the rotating vibration control system. The system preferably monitors a plurality of sensor signals.

In an embodiment the invention includes the electronic vibration control system, the system controlling the rotation of the first rotor and the rotation of the second rotor. The system monitors a plurality of sensor signals. The system controls the rotation speed, rotation direction and phase of the first rotor and the rotation speed, rotation direction and phase of the second rotor to minimize the first monitored vibration frequency sensor signal. The system controls the rotation of the third rotor and the rotation of the fourth rotor, with the system controlling the rotation speed, rotation direction and phase of the third rotor and the rotation speed, rotation direction and phase of the fourth rotor to minimize the second monitored vibration frequency sensor signal. Preferably the system opposingly orients the first rotor first imbalance mass concentration relative to the second rotor second imbalance mass concentration. Preferably the system opposingly orients the third rotor imbalance mass concentration relative to the fourth rotor imbalance mass concentration. Preferably the system includes a fault mode control protocol for controlling a rotation of the rotors during a sensed rotating vibration control system failure.

It will be apparent to those skilled in the art that various modifications and variations can be made to the invention without departing from the spirit and scope of the invention. Thus, it is intended that the present invention cover the modifications and variations of this invention provided they come within the scope of the appended claims and their equivalents. It is intended that the scope of differing terms or phrases in the claims may be fulfilled by the same or different structure(s) or step(s).

What is claimed is:

1. A rotary blade rotating hub mounted rotating assembly vibration control system for a rotary blade rotating hub assembly experiencing a vibration of a plurality of vibration frequencies while rotating at an operational rotation frequency about a rotating assembly center axis of rotation, said rotating assembly vibration control system comprising:
   a first imbalance mass concentration rotor, a second imbalance mass concentration rotor, a third imbalance mass concentration rotor, and a fourth imbalance mass concentration rotor,
   said first imbalance mass concentration rotor having a first imbalance mass concentration rotor center axis rotation centered on said rotating assembly center axis of rotation,
   said second imbalance mass concentration rotor having a second imbalance mass concentration rotor center axis rotation centered on said rotating assembly center axis of rotation,
   said third imbalance mass concentration rotor having a third imbalance mass concentration rotor center axis rotation centered on said rotating assembly center axis of rotation,
   said fourth imbalance mass concentration rotor having a fourth imbalance mass concentration rotor center axis rotation centered on said rotating assembly center axis of rotation,
   said first imbalance mass concentration rotor and said second imbalance mass concentration rotor driven at a first rotation speed greater than said rotating assembly operational rotation frequency while controlling the rotational position of said first imbalance mass concentration and said second imbalance mass concentration to produce a first rotating net force vector to inhibit a first vibration frequency,
   said third imbalance mass concentration rotor and said fourth imbalance mass concentration rotor driven at a second rotation speed greater than said rotating assembly operational rotation frequency while controlling the rotational position of said third imbalance mass concentration and said fourth imbalance mass concentration to produce a second rotating net force vector to inhibit a second vibration frequency.

2. A vibration control system as claimed in claim 1, wherein said first vibration frequency is a distinct frequency from said second vibration frequency and said first imbalance mass concentration rotor and said second imbalance mass concentration rotor is driven and controlled independently from said third imbalance mass concentration rotor and said fourth imbalance mass concentration rotor.

3. A vibration control system as claimed in claim 1, wherein said first vibration frequency is a distinct frequency from said second vibration frequency and said first imbalance mass concentration rotor rotational position control and said second imbalance mass concentration rotor rotational position control is segregated from said third imbalance mass concentration rotor rotational position control and said fourth imbalance mass concentration rotor rotational position control.

4. A vibration control system as claimed in claim 1, including a tachometer input and a first rotation speed rotors stage VC controller for controlling said first imbalance mass concentration rotor rotational position and said second imbalance mass concentration rotor rotational position, and a second rotation speed rotors stage VC controller for controlling said third imbalance mass concentration rotor rotational position and said fourth imbalance mass concentration rotor rotational position.

5. A vibration control system as claimed in claim 1, including a first rotation speed electronics control system for controlling said first imbalance mass concentration rotor rotational position and said second imbalance mass concentration rotor rotational position, and a second rotation speed electronics control system for controlling said third imbalance mass concentration rotor rotational position and said fourth imbalance mass concentration rotor rotational position.

6. A vibration control system as claimed in claim 1 including a fault mode control protocol for controlling a rotation of said rotors during a sensed failure of the rotating assembly vibration control system.

7. A vibration control system as claimed in claim 1 wherein said first imbalance mass concentration is opposingly oriented to said second imbalance mass concentration during a first starting stopping rotation speed less than said first rotation speed and said third imbalance mass concentration is opposingly oriented to said fourth imbalance mass concentration during a second starting stopping rotation speed less than said second rotation speed.

8. A rotating vibration control system for a rotating assembly having at least a first vibration frequency operational vibration and at least a second vibration frequency operational vibration, said rotating vibration control system comprised of:
   a first rotor with a first imbalance mass concentration, said first rotor driven to rotate at a first rotation speed greater than an operational rotation frequency of said rotating assembly, a second rotor with a second imbalance mass concentration, said second rotor driven to rotate at said first rotation speed greater than an operational rotation frequency of said rotating assembly a third rotor with a third imbalance mass concentration, said third rotor driven to rotate at a second rotation speed greater than an operational rotation frequency of said rotating assembly a fourth rotor with a fourth imbalance mass concentration, said fourth rotor driven to rotate at said second rotation speed greater than an operational rotation frequency of said rotating assembly at least a first vibration sensor for producing a plurality of first vibration sensor signals, at least a second vibration sensor for producing a plurality of second vibration sensor signals, a first rotor rotational position sensor, a second rotor rotational position sensor, a third rotor rotational position sensor, a fourth rotor rotational position sensor, a first motor control loop for controlling the rotation of said first rotor and the rotation of said second rotor, a first vibration control loop for providing commands to the first motor control loop to minimize said first vibration sensor signals and said second vibration sensor signals, a second motor control loop for controlling the rotation of said third rotor and the rotation of said fourth rotor, a second vibration control loop for providing commands to the second motor control loop to minimize said first vibration sensor signals and said second vibration sensor signals.

9. A rotary wing aircraft rotating hub mounted vibration control system for a rotary wing hub having at least a first and a second vibration frequency while rotating at a rotary wing operational rotation frequency, said rotating hub mounted vibration control system comprised of:

a system housing, said system housing attached to said rotary wing hub and rotating with said rotary wing hub at said operational rotation frequency, said housing a first coaxial ring motor having a first rotor with a first imbalance mass concentration, a second coaxial ring motor having a second rotor with a second imbalance mass concentration, a third coaxial ring motor having a third rotor with a third imbalance mass concentration, a fourth coaxial ring motor having a fourth rotor with a fourth imbalance mass concentration, an electronics control system for controlling the vibration control system said electronics control system including a first rotation speed rotor stage VC controller electronics control subsystem for controlling a rotational position of said first imbalance mass concentration rotor and a rotational position of said second imbalance mass concentration rotor, said first rotation speed rotor stage VC controller electronics control subsystem controlling a speed and a phase of said first coaxial ring motor and said second coaxial ring motor such that said first imbalance mass concentration and said second imbalance mass concentration are driven at a whole number multiple vibration canceling rotation frequency greater than said operational rotation frequency wherein said first rotary wing hub vibration frequency is reduced, said electronics control system including a second rotation speed rotor stage VC controller electronics control subsystem for controlling a rotational position of said third imbalance mass concentration rotor and a rotational position of said fourth imbalance mass concentration rotor, said second rotation speed rotor stage VC controller electronics control subsystem controlling a speed and a phase of said third coaxial ring motor and said fourth coaxial ring motor such that said third imbalance mass concentration and said fourth imbalance mass concentration are driven at a whole number multiple vibration canceling rotation frequency greater than said operational rotation frequency wherein said second helicopter rotary wing hub vibration frequency is reduced.

10. A method of controlling a plurality of vibration frequencies of an aircraft with a rotary hub which rotates at an operational rotation frequency, said method including providing an annular ring housing containing a first coaxial ring motor having a first rotor with a first imbalance mass concentration, a second coaxial ring motor having a second rotor with a second imbalance mass concentration, a third coaxial ring motor having a third rotor with a third imbalance mass concentration, a fourth coaxial ring motor having a fourth rotor with a fourth imbalance mass concentration, and an electronics control system for controlling the vibration control system said electronics control system including a first rotation speed rotor stage VC controller electronics control subsystem for controlling a rotational position of said first imbalance mass concentration rotor and a rotational position of said second imbalance mass concentration rotor, said electronics control system including a second rotation speed rotor stage VC controller electronics control subsystem for controlling a rotational position of said third imbalance mass concentration rotor and a rotational position of said fourth imbalance mass concentration rotor, and securing said annular ring housing to said rotary hub with said annular ring housing rotating at said operational rotation frequency with said rotary hub, driving said first rotor and said second rotor at a first whole number multiple vibration canceling rotation frequency greater than said operational rotation frequency while controlling the rotational position of said first imbalance mass concentration and said second imbalance mass concentration in order to inhibit a first vibration frequency driving said third rotor and said fourth rotor at a second whole number multiple vibration canceling rotation frequency greater than said operational rotation frequency while controlling the rotational position of said third imbalance mass concentration and said fourth imbalance mass concentration in order to inhibit a second vibration frequency.

11. An electronic vibration control system, said system controlling a rotation of a first rotor and a rotation of a second rotor, said system monitoring a plurality of sensor signals, said system controlling the rotation speed, rotation direction and phase of the first rotor and the rotation speed, rotation direction and phase of the second rotor to minimize a first monitored vibration frequency sensor signal, said system controlling a rotation of a third rotor and a rotation of a fourth rotor, with said system controlling the rotation speed, rotation direction and phase of the third rotor and the rotation speed, rotation direction and phase of the fourth rotor to minimize a second monitored vibration frequency sensor signal.

12. A system as claimed in claim 11 said system opposingly orienting a first rotor first imbalance mass concentration relative to a second rotor second imbalance mass concentration.

13. A system as claimed in claim 11, said system opposingly orienting a third rotor imbalance mass concentration relative to a fourth rotor imbalance mass concentration.

14. A system as claimed in claim 11, said system including a fault mode control protocol for controlling a rotation of said rotors during a sensed rotating vibration control system failure.

15. A system as claimed in claim 11, said system including a first rotation speed rotor stage VC controller electronics control subsystem for controlling the first rotor and the second rotor and a separate second rotation speed rotor stage VC controller electronics control subsystem for controlling the third rotor and the fourth rotor.

16. A system as claimed in claim 11 centered about a rotary wing center axis of rotation.

17. A system as claimed in claim 11 wherein said first and second rotors are separated from said third and fourth rotors.

* * * * *